(12) United States Patent
Wright et al.

(10) Patent No.: US 8,275,515 B2
(45) Date of Patent: Sep. 25, 2012

(54) SHOCK ABSORBER HEALTH AND CONDITION MONITORING DEVICE

(75) Inventors: Mark A. Wright, Albuquerque, NM (US); George L. Wright, Corrales, NM (US); Kevin G. Wright, Tularosa, NM (US)

(73) Assignee: Honeywell International Inc., Morristown, NJ (US)

( * ) Notice: Subject to any disclaimer, the term of this patent is extended or adjusted under 35 U.S.C. 154(b) by 456 days.

(21) Appl. No.: 12/509,648

(22) Filed: Jul. 27, 2009

(65) Prior Publication Data

US 2009/0287371 A1 Nov. 19, 2009

Related U.S. Application Data

(63) Continuation-in-part of application No. 11/955,198, filed on Dec. 12, 2007.

(51) Int. Cl.
*F16F 9/52* (2006.01)
(52) U.S. Cl. .......................... 701/37; 188/276
(58) Field of Classification Search .................. 701/36, 701/37, 34.4, 29.9; 188/266.6, 276, 266.2; 702/130; 374/117, 154; 280/5.503, 5.5
See application file for complete search history.

(56) References Cited

U.S. PATENT DOCUMENTS

| | | | |
|---|---|---|---|
| 3,833,094 A | 9/1974 | Grossman | |
| 4,458,234 A | 7/1984 | Brisard | |
| 5,200,895 A | 4/1993 | Emura et al. | |
| 5,305,860 A | 4/1994 | Rotharmel et al. | |
| 5,525,960 A | 6/1996 | Mccall et al. | |
| 5,555,500 A | 9/1996 | Ogawa et al. | |
| 5,788,028 A | 8/1998 | Bieber | |
| 6,061,613 A | 5/2000 | Zyburt et al. | |
| 6,141,620 A | 10/2000 | Zyburt et al. | |
| 6,278,361 B1 | 8/2001 | Magiawala et al. | |
| 6,659,240 B2 | 12/2003 | Dernebo | |
| 6,759,952 B2 | 7/2004 | Dunbridge et al. | |
| 6,813,558 B1 | 11/2004 | Lapstun et al. | |
| 6,871,137 B2 | 3/2005 | Scaer et al. | |
| 6,918,472 B2 | 7/2005 | Dernebo | |
| 7,102,492 B2 | 9/2006 | Weber | |
| 7,135,993 B2 | 11/2006 | Okamoto et al. | |
| 7,244,003 B2* | 7/2007 | Larson | 303/191 |
| 7,443,288 B2* | 10/2008 | Dunbridge et al. | 340/444 |
| 7,650,210 B2* | 1/2010 | Breed | 701/29 |
| 2003/0195683 A1 | 10/2003 | Oakley et al. | |

(Continued)

OTHER PUBLICATIONS

W. Fleming, "Overview of Automotive Sensors", IEEE Sensors Journal, vol. 1, No. 4, Dec. 2001, pp. 296-308.

(Continued)

*Primary Examiner* — Dalena Tran
(74) *Attorney, Agent, or Firm* — Ingrassia Fisher & Lorenz, P.C.

(57) ABSTRACT

Apparatus and method for determining shock-absorber wear are presented. The device includes a shock absorber, a temperature sensor, and an electronics assembly. The temperature sensor may generate temperature data for the shock absorber. The electronics assembly may determine a condition of the shock absorber based on the temperature data. The temperature sensor may be inside, on the surface, or nearby the shock absorber. A condition of the shock absorber, such as a shock-wear value or a remaining useful life (RUL) is determined, based on the temperature data. A shock-wear state may be determined by comparing the shock-wear value to one or more thresholds. A shock-wear indicator and/or a combined indicator may indicate the shock-wear value, RUL, and/or the shock-wear state.

19 Claims, 11 Drawing Sheets

U.S. PATENT DOCUMENTS

| | | |
|---|---|---|
| 2004/0054554 A1 | 3/2004 | Barts et al. |
| 2004/0157650 A1 | 8/2004 | Wissinger et al. |
| 2007/0239324 A1 | 10/2007 | Ehrman et al. |
| 2007/0241882 A1 | 10/2007 | Panttaja et al. |
| 2007/0260372 A1 | 11/2007 | Langer |

OTHER PUBLICATIONS

J.C. Ramos et al., "Development of a thermal model for automotive twin-tube shock absorbers", Applied Thermal Engineering, vol. 25, Dec. 16, 2004, pp. 1836-53, Elsevier.

Sport Devices, "SportDevices Shock Absorber Analyzer", Oct. 16, 2006, available at http://www.sportdevices.co.uk/shockabsorber/index.htm (last visited Jul. 14, 2009).

Sport Devices, "Shock Analyzer Documentation", undated, available at http://www.sportdevices.co.uk/shockabsorber/shockanalyzer11.pdf (last visited Jul. 26, 2009).

U.S. Appl. No. 12/022,859 entitled "Apparatus, System, and Method for Onboard Degraded and Deadlined Mechanical System Alerting" filed Jan. 30, 2008.

U.S. Appl. No. 12/182,480 entitled "Method, System, and Apparatus for Friction Pad Wear and Brake Condition Monitoring" filed Jul. 30, 2008.

Wright, et al.; USPTO Office Action for U.S. Appl. No. 11/955,198; Notification date Feb. 2, 2011.

Military Professional Resources, Incorporated, Convoy Leader Handbook, Revision IV, Jan. 19, 2004, Camp Doha, Kuwait APO AE 09889.

Headquarters Department of the Army, FM 55-30 Army Motor Transport Units and Operations, Jun. 27, 1997, Washington DC, USA.

SCB Consulting, LLC, Fleetmate Customer Guide: Installation, http://www.fleetmate.com/guides/1-Installation.pdf, printed from the World Wide Web on Dec. 11, 2007.

SCB Consulting, LLC, Fleetmate Customer Guide—Basics, http://www.fleetmate.corn/guides/2-The%20Basics.pdf , printed from the World Wide Web on Dec. 11, 2007.

SCB Consulting, LLC, Fleetmate Customer Guide—Setup, http://www.fleetmate.com/guides/3-Setup.pdf, printed from the World Wide Web on Dec. 11, 2007.

SCB Consulting, LLC, Fleetmate Customer Guide: Preferences, http://www.fleetmate.com/guides/4-Preferences. pdf, printed from the World Wide Web on Dec. 11, 2007.

SCB Consulting LLC, Fleetmate Customer Guide: Security, http://www.fleetmate.com/guides/5-Security.pdf, printed from the World Wide Web on Dec. 11, 2007.

SCB Consulting LLC, Fleetmate Customer Guide: Vehicle Records, http://www.fleetmate.com/guides/6-Vehicle_Records.pdf, printed from the World Wide Web on Dec. 11, 2007.

SCB Consulting, LLC, Fleetmate Customer Guide: Fuel Records, http://www.fleetmate.com/guides/7-Fuel_Records.pdf, printed from the World Wide Web on Dec. 11, 2007.

SCB Consulting LLC, Fleetmate Customer Guide: Work Orders, http://www.fleetmate.com/guides/8-Work_Order_Records.pdf, printed from the World Wide Web on Dec. 11, 2007.

SCB Consulting LLC, Fleetmate Customer Guide: Payment/Expense Records, http://www.fleetmate.com/guides/9-Payment_Records.pdf, printed from the World Wide Web on Dec. 11, 2007.

SCB Consulting LLC, Fleetmate Customer Guide: Inventory and Receiving, http://www.fleetmate.com/guides/10-Inventory_and_Receiving.pdf, printed from the World Wide Web on Dec. 11, 2007.

SCB Consulting LLC, Fleetmate Customer Guide: Route Records, http://www.fleetmate.com/guides/11-Route_Records.pdf, printed from the World Wide Web on Dec. 11, 2007.

SCB Consulting LLC, Fleetmate Customer Guide: Scheduled Reminders, http://www.fleetmate.com/guides/12-Scheduled_Reminders.pdf, printed from the World Wide Web on Dec. 11, 2007.

SCB Consulting LLC, Fleetmate Customer Guide: Recurring Tasks, http://www.fleetmate.com/guides/13-Recurring_Tasks.pdf, printed from the World Wide Web on Dec. 11, 2007.

SCB Consulting LLC, Fleetmate Customer Guide: Recurring Task Templates, http://www.fleetmate.com/guides/14-Recurring_Task_Templates.pdf, printed from the World Wide Web on Dec. 11, 2007.

SCB Consulting LLC, Fleetmate Customer Guide: Tire Management, http://www.fleetmate.com/guides/15-Tire_Management.pdf, printed from the World Wide Web on Dec. 11, 2007.

SCB Consulting LLC, Fleetmate Customer Guide: Report Designer, http://www.fleetmate.com/guides/FLEETMATE%20Report%20Designer.pdf, printed from the World Wide Web on Dec. 11, 2007.

SCB Consulting LLC, Fleetmate Customer Guide: Barcode Features, http://www.fleetmate.com/guides/17-Barcode_Features.pdf, printed from the World Wide Web on Dec. 11, 2007.

SCB Consulting LLC, Fleetmate Customer Guide: Fuel Import Manager, http://www.fleetmate.com/guides/20-Fuel%20Import%20Manager.pdf, printed from the World Wide Web on Dec. 11, 2007.

SCB Consulting LLC, Fleetmate Customer Guide: Work Order Retrieval, http://www.fleetmate.com/guides/21-Work%20Order%20Retrieval.pdf, printed from the World Wide Web on Dec. 11, 2007.

GAO RFID Inc., RFID for Fleet Maintenance, http://fleetmaintenance.gaorfid.com/, printed from the World Wide Web on Dec. 11, 2007.

GAO RFID Inc., RFID for Railway, http://railway.gaorfid.com/ , printed from the World Wide Web on Dec. 11, 2007.

Geodecisions, Irris Overview, http://www.irris.com/overview.htm, printed from the World Wide Web on Dec. 11, 2007.

System Architecture, ATCS Specification 100, Revision 4.0, May 1994, http://www.atcsmon.com/100_4_0.htm, printed from the World Wide Web on Dec. 11, 2007.

Optrak Distribution Software Ltd., Planing your route to the future, http://www.optrak.co.uk/, printed from the World Wide Web on Dec. 11, 2007.

Optrak Distribution Software Ltd., Optrak4 Vehicle Routing, Loading and Scheduling, http://www.optrak.co.uk/en/routing.html, printed from the World Wide Web on Dec. 11, 2007.

Optrak Distribution Software Ltd., Vehicle Routing Software—The Benefits, http://www.optrak.co.uk/en/pressben.html, printed from the World Wide Web on Dec. 11, 2007.

Optrak Distribution Software Ltd., Strategic Planning, http://www.optrak.co.uk/en/planning.html, printed from the World Wide Web on Dec. 11, 2007.

GeoMetrix Inc., GeoMetrix a Rail Logistics Guidance System, http://www.geometrix.ca/brochures/gm_160402.pdf, printed from the World Wide Web on Dec. 11, 2007.

EP Communication, EP 08170409.0/2221 dated Apr. 3, 2012.

Notice from the European Patent Office dated Oct. 1, 2007 concerning business methods, Nov. 2007.

Optrak Distribution Software Ltd., Optrak4 Real Time, http://www.optrak.co.uk/en/realtime.html, printed from the World Wide Web on Dec. 11, 2007.

Optrak Distribution Software Ltd., Optrak4 Data Warehouse, http://www.optrak.co.uk/en/warehouse.html, printed from the World Wide Web on Dec. 11, 2007.

Optrak Distribution Softwae Ltd., Optrak4 Map Engine, http://www.optrak.co.uk/en/map.html, printed from the World Wide Web on Dec. 11, 2007.

Optrak Distribution Software Ltd., Optrak4 Business Intelligence, http://www.optrak.co.uk/en/businessintelligence.html, printed from the World Wide Web on Dec. 11, 2007.

Optrak Distribution Software Ltd., Solutions, http://www.optrak.co.uk/en/solutions.html, printed from the World Wide Web on Dec. 11, 2007.

* cited by examiner

SHOCK ABSORBER HEALTH AND CONDITION MONITORING DEVICE

RELATED APPLICATIONS

The present application is a continuation-in-part of U.S. patent application Ser. No. 11/955,198 entitled "Vehicle Deployment Planning System", filed Dec. 12, 2007 ("the Fleet-Planning Application"), which is entirely incorporated by reference herein for all purposes.

BACKGROUND OF THE INVENTION

1. Field of the Invention

This invention relates to the field of shock absorbers. Most particularly, this invention relates to a measuring a condition of a shock absorber based on temperature of shock absorbers.

2. Background

Shock absorbers are used on a wide variety of devices. Typically, one or more shock absorbers are mounted near each wheel of a vehicle. The shock absorber acts to translate kinetic energy from the wheel that is perpendicular to a road surface into thermal energy of a fluid of the shock absorber, thereby reducing or eliminating the perception of kinetic energy perpendicular to the road surface to the users of the vehicle. For example, if a wheel of a car hits a bump in a road, the kinetic energy perpendicular to the road surface that would be translated by hitting the bump into the passenger compartment of the car is partially or completely dampened by the fluid of the shock absorber(s) attached to the wheel. Thus, shock absorbers provide a safer and more comfortable ride for vehicle users.

FIG. 1 shows a cross-sectional view of a typical shock absorber 100. The body of shock absorber 100 is made up of an outer cylinder (a.k.a. reserve tube) 120 and an inner cylinder (a.k.a. pressure tube) 130.

Shock absorber 100 may be mounted to a vehicle (or other mechanical device) using upper mount 110 to connect shock absorber 100 to a frame of the vehicle and lower mount 112 to connect to an axle of the vehicle. Typically, the shock absorber 100 is mounted within a spring (not shown in FIG. 1) that is also connected to the frame and the axle of the vehicle. The upper mount 110 is connected to piston 140 via piston rod 142.

Shock absorber 100 uses fluid 150 to translate kinetic energy of a vehicle into thermal energy. When a wheel connected to the axle of the vehicle impacts a bump or other obstacle, part of the energy of the impact is transferred to piston 140 via upper mount 110 and piston rod 142. As piston 140 moves within inner cylinder 130, small amounts of fluid 150 are permitted to pass through orifices 144a and 144b of piston 140. As only small amounts of fluid 150 are permitted to pass through orifices 144a and 144b; fluid 150 is kept under high pressure. As piston 140 moves through highly pressurized fluid 150, up-and-down motion of piston 140 is slowed, which dampens the motion of the spring. The motion of piston 140 and pressurization may then increase the thermal energy of fluid 150.

Shock absorber 100 may be subject to failure when fluid 150 escapes from the shock absorber 100 or fails to circulate and/or if the piston 140 and/or piston rod 142 is subject to mechanical failure.

SUMMARY

A first embodiment of the invention provides a device. The device includes a shock absorber, a temperature sensor, and an electronics assembly. The temperature sensor is configured to generate temperature data based on measuring a temperature of the shock absorber. The electronics assembly is configured to determine a condition of the shock absorber based on the temperature data.

A second embodiment of the invention provides a system. The system includes a first shock absorber, a first sensor, and a shock-wear calculator. The first shock absorber is configured for use in a vehicle. The first sensor is configured to generate first shock-absorber data. The first shock-absorber data includes temperature data of the first shock absorber. The shock-wear calculator includes a processing unit, a shock-wear indicator, data storage, and machine-language instructions stored in the data storage and executable by the processing unit to perform functions. The functions include receiving the first shock-absorber data and displaying an indication of the condition of the first shock absorber on the shock-wear indicator. The condition of the first shock absorber is based on the first shock-absorber data.

A third principal embodiment of the invention provides a method. A characteristic of a shock absorber is measured. A status of a mechanical system is determined based on the measured characteristic of the shock absorber, where the mechanical system includes the shock absorber. The condition of the mechanical system is determined based on the status of the mechanical system. The condition of the mechanical system is indicated.

BRIEF DESCRIPTION OF THE DRAWINGS

Various examples of embodiments are described herein with reference to the following drawings, wherein like numerals denote like entities, in which.

DETAILED DESCRIPTION

Figure 1:
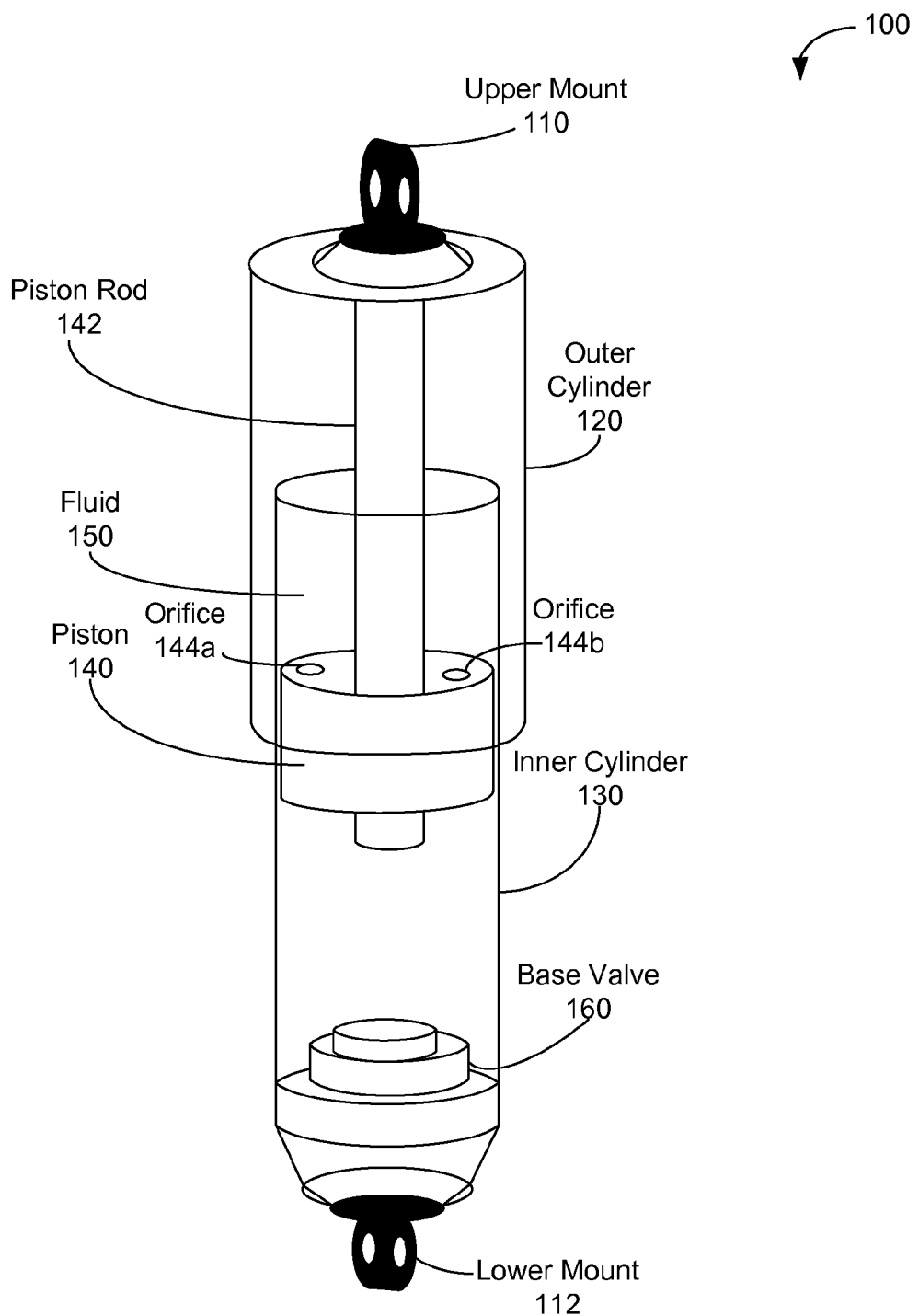
FIG. 1 shows a cross-sectional view of a typical shock absorber.

The invention includes measuring a temperature of a shock absorber to provide an indication of shock absorber wear or "shock wear" and/or a remaining useful life (RUL) for shock absorbers. A sensor within the shock absorber, on one or more surfaces of a shock absorber, and/or nearby the shock absorber may measure the temperature. One or more nearby temperature sensors may be mounted near one or more shock absorbers that are part of a mechanical system utilizing the shock absorber(s) (e.g., a vehicle). In other scenarios, the nearby temperature sensor may be separate from the device utilizing the shock absorber. For example, the nearby temperature sensor may be an infrared (IR) wand or similar device that can be used by a technician to measure shock-absorber temperature.

An electronics assembly may connect to one or more temperature sensors. The electronics assembly may determine the shock wear and/or RUL of the shock absorber based on the temperature data from the temperature sensors. The electronics assembly may include the temperature sensor(s) in some embodiments. As the fluid within the shock absorber escapes, the fluid fails to circulate, and/or the shock absorber is subject to mechanical failure during the life of the shock absorber, measured temperature(s) within the temperature data for the shock absorber may change.

Temperature data from shock absorbers may provide diagnostic information about shock absorbers and/or other components of a mechanical system. In some circumstances, the temperature of the shock absorber may be relatively cooler as condition of the shock absorber is a degraded or critical condition, such as when the fluid within the shock absorber escapes, the fluid fails to circulate, and/or the shock absorber is subject to mechanical failure. In other circumstances, the temperature of the shock absorber may be relatively warmer, perhaps due to nearby failing components, such as wheel bearings, brakes, tires and/or wheels of a vehicle utilizing a relatively-warmer shock absorber. Then, for mechanical systems with multiple shock absorbers, determining differential temperatures and/or comparing temperature data between shock absorbers may indicate a mechanical system failure.

For example, suppose a mechanical system has four shock absorbers. After one hour of operation of the example mechanical system, let the temperatures of four shock absorbers be (in ° C.): 70, 72, 71, and 64. Then, determining differences between the four shock-absorber temperatures and/or comparing temperature data between the four shock absorbers in this example may indicate the fourth shock absorber (e.g., the one with the 64° C. reading) is a degraded or critical condition.

As another example, suppose the temperatures of four shock absorbers in the above example mechanical system are (in ° C.): 70, 72, 71, and 94. In this example, temperature data from the fourth shock absorber (e.g., the one with the 94° C. reading) may indicate failure of a nearby component, such as a wheel bearing or brake.

In some embodiments, determination of a condition of a nearby component of a shock absorber may be correlated with data from one or more break-wear sensors. The brake-wear sensor is described in detail in U.S. patent application Ser. No. 12/182,480 entitled "Method, System, and Apparatus for Friction Pad Wear and Brake Condition Monitoring" filed on Jul. 30, 2008 ("the Brake-Wear Application"), which is entirely incorporated by reference herein for all purposes.

A temperature profile of the shock absorber may be determined for comparison with current temperature measurements to determine shock wear. A profile may contain one or more "shock-wear thresholds" or thresholds that indicate an amount of shock wear and/or RUL for the shock absorber.

The profile for a given shock absorber may be an "absolute" profile, perhaps determined by modeling and/or laboratory test data of the temperature of shock absorbers over their useful life. Models of shock absorber temperature over time based on laboratory testing are presented by J. C. Ramos et al., "Development of a Thermal Model for Automotive Twin-Tube Shock Absorbers", Applied Thermal Engineering, vol. 25, pp. 1836-53, Dec. 16, 2004, ("Ramos") which is entirely incorporated by reference herein for all purposes.

Also or instead, the profile for a given shock absorber may be a "relative" profile. The relative profile may include measurements made for other shock absorbers used with the same device as the given shock absorber. For example, an automobile may include four shock absorbers and temperature data may be gathered for one or more of the four shock absorbers.

Once the temperature data is gathered, a profile may be generated based on the observed temperature data. Also, combined absolute and relative profiles may be used as well—for example, an absolute profile may be modified based on temperature observations for one or more shock absorbers in use on a device.

Further, shock-absorber profiles may be determined for a fleet of vehicles, perhaps on a shock-absorber model and/or vehicle-model basis. These "fleet-wide profiles" may be determined, reported, and/or used by a convoy planning tool, such as described the Fleet-Planning Application. For example, fleet-wide reporting and/or maintenance activities (e.g., shock absorber replacement and/or inspection) may be scheduled based on comparing measurements of shock absorber(s) of given vehicle(s) with fleet-wide profile(s) for shock absorbers of the given vehicle(s).

The measured temperature(s) and the profile(s) may be a basis to determine the amount of shock wear and/or RUL. For example, the shock wear and/or RUL for a shock absorber may be determined by comparing temperature measurements to one or more shock-wear thresholds. The determination of the shock wear may be performed by the electronics assembly and/or by a shock-wear calculator that receives the measurement of the temperature (and perhaps other characteristics) and then determines the shock wear and/or RUL. As more than one shock absorber may be used at one time, the temperature data for a given shock absorber may also include an indication of a location of the given shock absorber.

The determined shock wear and/or RUL may be displayed. For example, a view of a percentage of shock wear and/or RUL may be provided. A graphical "stop-light display" of shock wear and/or RUL may be provided as well. The stop-light display may provide a graphical indication of one or more states of shock wear, including but not limited to a normal state, a degraded state and a critical state of shock wear. An estimate of RUL, such as the number of miles to change the shock absorbers, may be provided based on the determined shock wear. An indication of a state of a particular shock absorber of the vehicle may be provided instead or as well (e.g., the front driver-side shock absorber is 20% degraded).

The shock-wear calculator may also include the functionality of a mechanical-system (MS)-health indicator and/or a brake-wear indicator. The MS-health indicator is described in detail in U.S. patent application Ser. No. 12/022,859 entitled "Apparatus, System, and Method for Onboard Degraded and Deadlined Mechanical System Alerting" filed on Jan. 30, 2008 ("the MS-Alert Application"), which is entirely incorporated by reference herein for all purposes. The brake-wear indicator is described in detail in the Brake-Wear Application. In particular, if the vehicle is equipped with an oil-viscosity sensor as described in the MS-Alert Application and/or a brake-wear sensor as described in the Brake-Wear Application, indication(s) of the MS-health of the vehicle and/or the brake wear of the vehicle may be provided as well. As another example, combining data from brake-wear sensor(s) and temperature data from shock absorbers may lead to better diagnosis of brakes, wheels, wheel bearings, shock absorbers, and/or other components of a vehicle or other mechanical system. A combined indicator may act as a shock-wear indicator, brake-wear indicator, and/or MS-health indicator.

The inventions described herein are applicable to other aspects of devices used for mechanical damping, such as but not limited to other types of shock absorbers not shown in the figures, as well as struts, springs, steering dampeners, and similar devices.

An Example Vehicle

Figure 2:
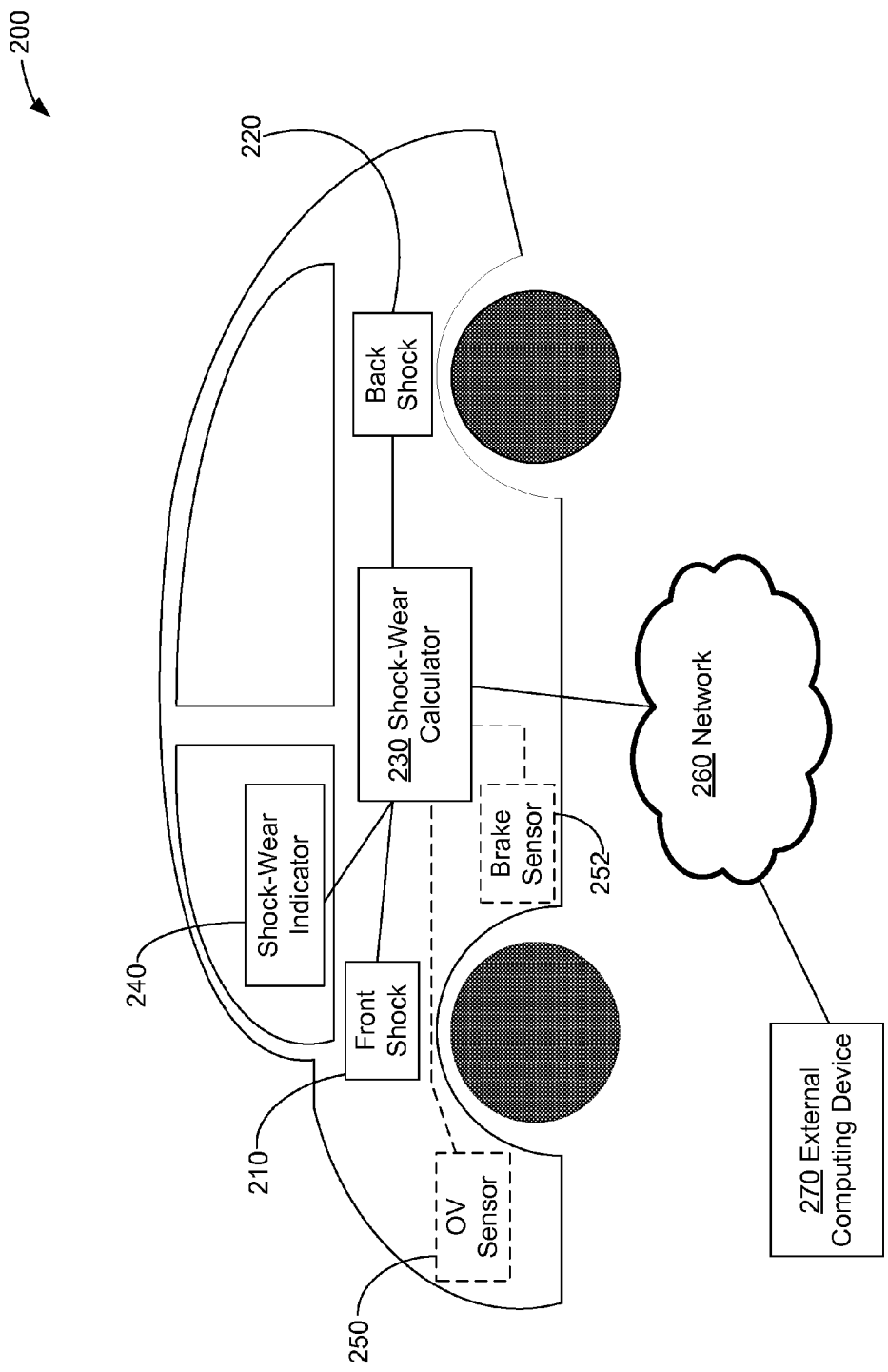
FIG. 2 shows a vehicle with front and back shock absorbers, a shock-wear calculator, and a shock-wear indicator in accordance with embodiments of the invention.

Turning again to the figures, FIG. 2 shows a vehicle 200 with a front shock absorber 210 and a back shock absorber 220, a shock-wear calculator 230, and a shock-wear indicator 240 in accordance with embodiments of the invention.

The front shock absorber 210 and/or the back shock absorber 220 may be equipped with and/or be near to temperature sensors, such as shown in FIGS. 3A, 3B, 3C, 3D, and 3E, and discussed below. As such, the shock-wear calculator 230 may receive indication(s) of shock-absorber temperatures from the front shock absorber 210 and/or the back shock absorber 220. Based on the indication(s) of shock-absorber temperatures, the shock-wear calculator 230 may determine shock wear of the front shock absorber 210 and/or the back shock absorber 220. The shock-wear calculator 230 may display indications of shock wear on the shock-wear indicator 240 for the front shock absorber 210 and/or the back shock absorber 220.

A shock absorber may have a location. For example, the front shock absorber 210 is located toward the front of the vehicle 200 and the back shock absorber 220 is located toward the back of the vehicle 200. The indication of shock wear may indicate a location of a shock absorber, such as "Front Driver-Side Shock Absorber" for an indication of shock wear from the front shock absorber 210. Then, shock-wear calculator 230 or other device sending an indication of shock wear may have stored data indicating a location of the shock absorber, such as a textual string (e.g., "Front Driver-Side Shock Absorber") or a shock absorber identifier, such as a serial number, bar code value, and/or other RFID-encoded information. If a shock absorber identifier is used to determine location, shock-wear calculator 230 may determine a location of a shock absorber using a table or similar data structure that relates shock absorber identifiers to shock absorber locations. If a vehicle has more than two axles (e.g., a semi tractor or cargo trailer), the location may identify an axle number and/or a side of the shock absorber. Example shock absorber identifiers for a truck trailer with 4 axles may be "Axle 3 Driver-Side Front Shock Absorber" and/or "Axle 2 Passenger-Side Back Shock Absorber".

The location of a shock absorber may be determined, alternatively or in addition, based on characteristics of the connection between the shock-wear calculator 230 and the shock absorber. For example, the shock-wear calculator 230 may connect to a shock absorber at a defined position on the shock-wear calculator 230, such as connecting to the front shock absorber 210 at shock absorber-connection point #1 and the back shock absorber 220 at shock absorber-connection point #2 of the shock-wear calculator. Continuing with the example, the shock-wear calculator may determine that any indications of shock wear received at shock absorber-connection point #2 are from the back shock absorber 220 and thus determine the location of the shock absorber providing the indication of shock wear.

The shock-wear calculator 240 may store data about the vehicle 200. In particular, the shock-wear calculator 240 may store data about shock wear, such as each received indication of shock wear from each shock absorber (i.e., front shock absorber 210 and back shock absorber 220) of the vehicle 200. The shock-wear calculator 240 may also store information about the MS-health of vehicle 200, if vehicle 200 is equipped with an oil-viscosity sensor 250. The shock-wear calculator 230 may send the stored data about the vehicle 200 to an external computing device 270, perhaps via a network 260. The shock-wear calculator 230 may send the stored data to the external computing device 270 using a format of an MS-health record, which is described in more detail in the MS-Alert Application as well as in Table 4 below with regards to the discussion of FIG. 5A. The shock-wear calculator 240 and/or external computing device 270 may include the functionality and/or may utilize fleet-wide profiles of a convoy planning tool and/or a convoy requirement server as described in more detail in the Fleet-Planning Application.

The vehicle 200 may be equipped with an oil-viscosity sensor 250 and/or brake sensor(s) 252. FIG. 2 shows oil-viscosity (OV) sensor 250 and brake sensor 252 using dashed lines to indicate the oil-viscosity sensor 250 and brake sensor 252 are optional components of vehicle 200.

The shock-wear calculator 230 may comprise the functionality of an MS-alert apparatus described in the MS-Alert Application and/or brake-wear calculator described in the Brake-Wear Application. As such, the shock-wear calculator 230 may receive one or more indications of health of an engine of the vehicle 200 from the oil-viscosity sensor 250 and possibly other sensors attached to the engine of the vehicle 200 (other sensors not shown). The shock-wear calculator 230 may then determine an MS-health measurement value and/or an MS-health state. The shock-wear calculator 230 may display the MS-health measurement value and/or the MS-health state on the shock-wear indicator 240. Similarly, the shock-wear calculator 230 may receive one or more indications of brake wear from the brake sensor 252 and possibly other brake sensors attached to the engine of the vehicle 200 (other brake sensors not shown).

Example Shock Absorbers

The temperature sensor may measure a temperature inside of the shock absorber, on a surface of the shock absorber, and/or near the shock absorber. FIGS. 3A, 3B, 3C, and 3D show example shock absorber configurations.

Figure 3A:
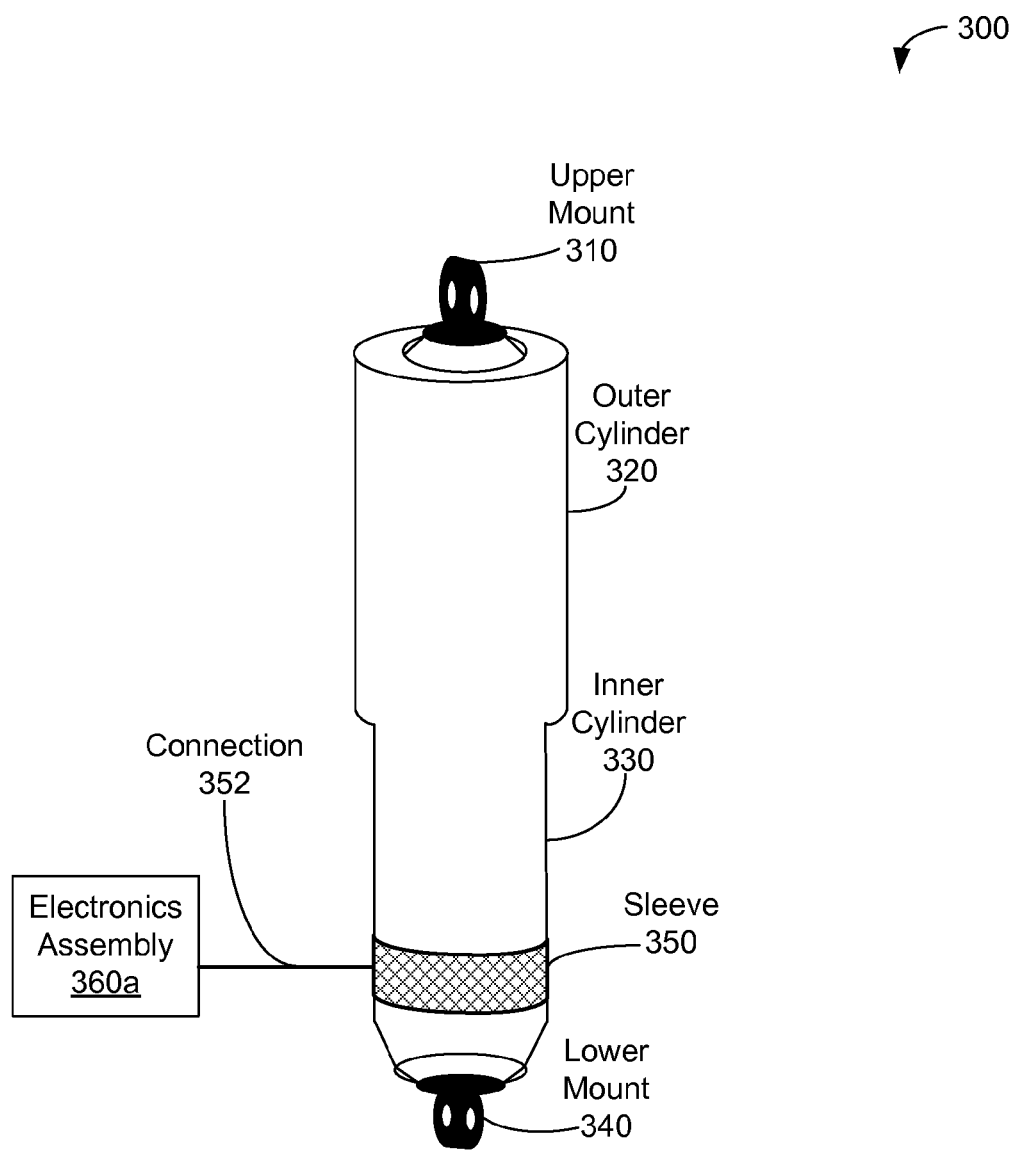
FIGS. 3A, 3B, 3C, and 3D are cross-sectional views of example shock absorbers in accordance with embodiments of the invention.

FIG. 3A is a cross-sectional view of an example shock absorber 300 in accordance with embodiments of the invention. As with shock absorber 100, shock absorber 300 includes an upper mount 310, outer cylinder 320, inner cylinder 330, and lower mount 340. Shock absorber 300 also includes a sleeve 350 connected via connection 352 to electronics assembly 360a.

As shown in FIG. 3A, sleeve 350 covers part of inner cylinder 330. In other embodiments, sleeve 350 may be configured as part or all of outer cylinder 320 and/or inner cylinder 330. In particular, sleeve 350 may be configured to be removably attached to outer cylinder 320 and/or inner cylinder 330. As sleeve 350 may be removably attached to a shock absorber, sleeve 350 may generate temperature data for originally-installed and replacement shock absorbers. Note that sleeve 350 may be cover more or less of shock absorber 300 than shown in FIG. 3A.

Sleeve 350 may be configured to generate temperature data of an outside surface of the shock absorber 300. Sleeve 350 may be and/or include a temperature sensor configured to generate temperature and/or other data of the outside surface of the shock absorber 300. The temperature sensor may be or include one or more resistance temperature detectors (RTDs), resistance thermometers, thermocouples, thermometers, and/or or other temperature or heat-measuring devices.

The temperature data may include one or more measurements of temperature of a surface of outer cylinder 320, a surface of inner cylinder 330, average temperature measurements, measurements of changes in temperature, and/or a combination of these measurements. Other temperature measurements and/or temperature data are possible as well. Further, sleeve 350 may perform other types of measurements of shock absorber 300.

FIG. 3A shows sleeve 350 connected to electronics assembly 360a via connection 352. Sleeve 350 may be configured to communicate with electronics assembly 360a via connection 352. Connection 352 may include wired and/or wireless connections. For example, connection 352 may include wired-communication interface(s) and/or a wireless-communication interface(s) of a network-communication interface described below with respect to FIG. 4.

Electronics assembly 360a may be configured to receive data generated by sleeve 350 via connection 352. Upon reception of the data, the electronics assembly 360a may be configured to generate shock-wear values and/or other values. The electronics assembly 360a may use a temperature/shock-wear relationship, such as described in detail below with respect to FIG. 5A, to determine shock-wear values and/or other values based on temperature and/or other data from sleeve 350. The electronics assembly 360a may communicate received data, shock-wear values and/or other values to a computing device, perhaps using a network-communication interface described below with respect to FIG. 4.

Figure 3B:
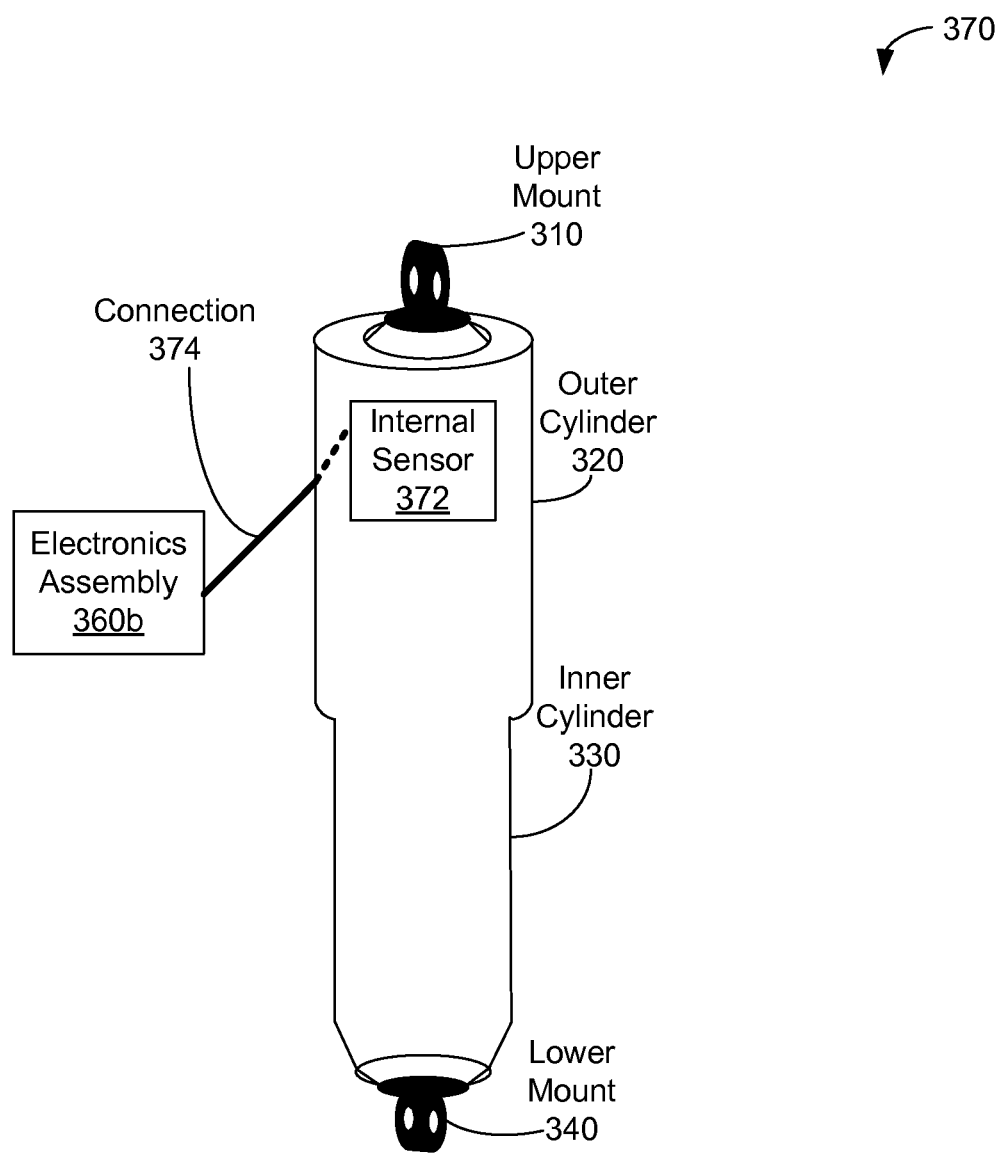

FIG. 3B is a cross-sectional view of an example shock absorber 370 in accordance with embodiments of the invention. As with shock absorber 300, shock absorber 370 includes an upper mount 310, outer cylinder 320, inner cylinder 330, and lower mount 340. Shock absorber 370 also includes an internal sensor 372 connected via connection 374 to electronics assembly 360b. Internal sensor 372 may be configured as part of outer cylinder 320, inner cylinder 330, a piston, piston rod and/or one or more other components of shock absorber 370.

Internal sensor 372 may be configured to generate temperature and/or other data from the inside of the shock absorber 370. Internal sensor 372 may be or include one or more RTDs, resistance thermometers, thermocouples, thermometers, and/or other temperature or heat-measuring devices, as well as devices to take other measurements. The temperature and/or data may include one or more measurements of temperature of an inner surface of outer cylinder 320, a inner surface of inner cylinder 330, a temperature of a fluid within shock absorber 370, temperature of a piston, temperature of a piston rod, average temperature measurements, measurements of changes in temperature, and/or a combination of these measurements. Other temperature measurements and/or temperature data are possible as well. Further, internal sensor 372 may perform other types of measurements of shock absorber 370.

FIG. 3B shows internal sensor 372 connected to electronics assembly 360b via connection 374. Internal sensor 372 may be configured to communicate with electronics assembly 360b via connection 374. Connection 374 may include wired and/or wireless connections such as described above with connection 350 of FIG. 3A.

Electronics assembly 360b may be configured to receive data generated by internal sensor 372 via connection 374. Upon reception of the data, the electronics assembly 360b may be similarly configured to electronics assembly 360a and/or may include the functionality of electronics assembly 360a described above with respect to FIG. 3A. In addition or instead of the temperature/shock-wear relationship described above for electronics assembly 360a, a temperature/shock-wear relationship of electronics assembly 360b may relate temperature data taken from internal sensor 372 to shock-wear values and/or other values.

Figure 3C:
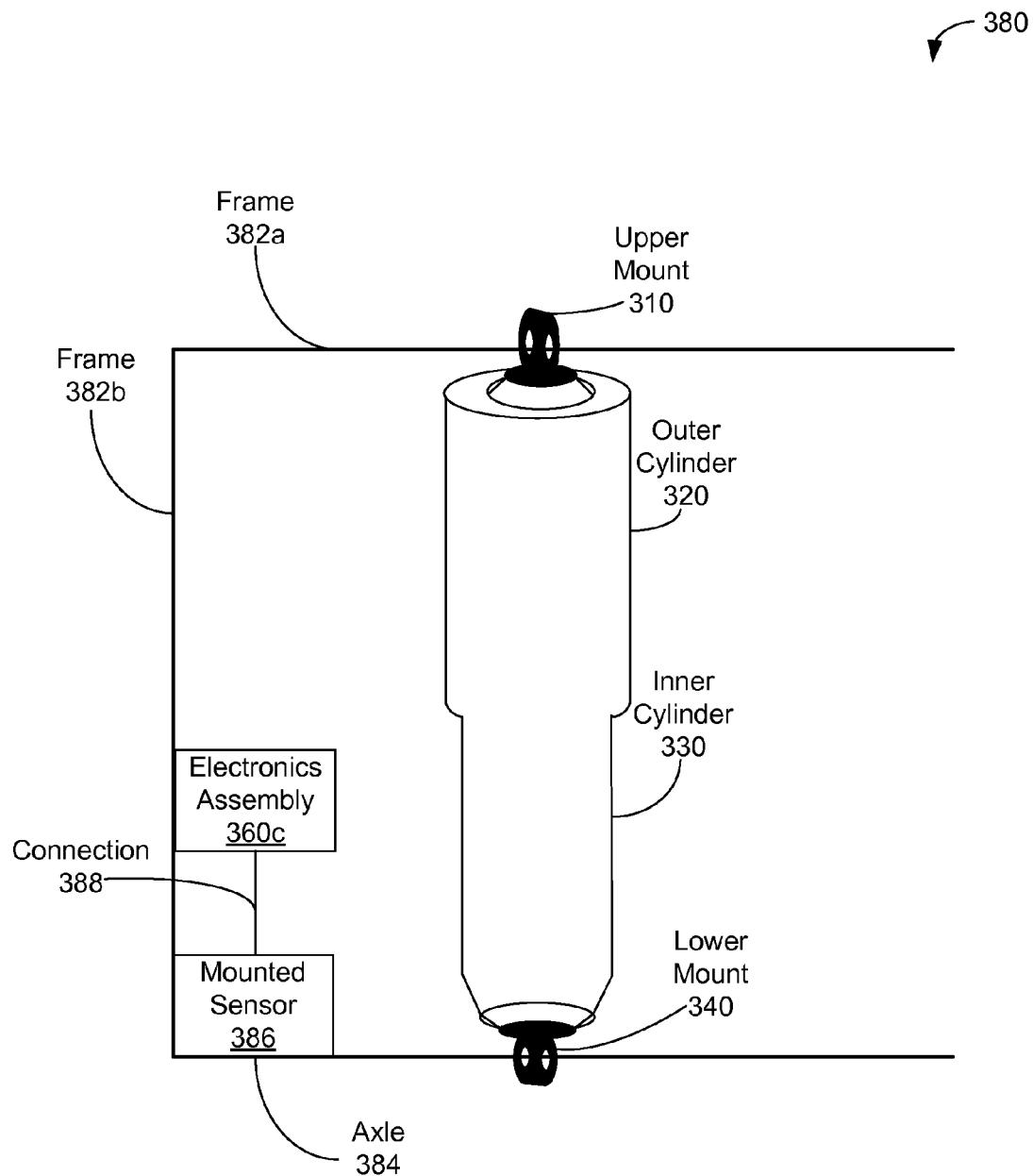

FIG. 3C is a cross-sectional view of an example shock absorber 380 in accordance with embodiments of the invention. As with shock absorber 300, shock absorber 380 includes an upper mount 310, outer cylinder 320, inner cylinder 330, and lower mount 340. FIG. 3C shows shock absorber 380 mounted to frame 382a and axle 384. FIG. 3C shows mounted sensor 386 mounted to frame 382b near shock absorber 380 and mounted sensor 386 connected to electronics assembly 360c. In some embodiments, frame 382a and 382b may comprise one member instead of the two members shown in FIG. 3C. In some embodiments, mounted sensor 386 may be part of electronics assembly 360c-connection 388 may or may not be present in such embodiments.

FIG. 3C shows mounted sensor 386 connected to electronics assembly 360c via connection 388. Mounted sensor 386 may be configured to generate temperature and/or other data from outside, but nearby, shock absorber 380. Mounted sensor 386 may be or include one or more RTDs, resistance thermometers, thermocouples, thermometers, and/or other temperature or heat-measuring devices, as well as devices to take other measurements.

The temperature and/or data may include one or more measurements of temperature near outer cylinder 320, inner cylinder 330, average temperature measurements, measurements of changes in temperature, and/or a combination of these measurements. Other temperature measurements and/or temperature data are possible as well. Further, mounted sensor 386 may perform other types of measurements of shock absorber 380.

FIG. 3C shows mounted sensor 386 connected to electronics assembly 360c via connection 388. Mounted sensor 386 may be configured to communicate with electronics assembly 360c via connection 388. Connection 388 may include wired and/or wireless connections such as described above with connection 350 of FIG. 3A. In embodiments where mounted sensor 386 is part of electronics assembly 360c, electronics assembly 360c may receive data generated by sensors that are part of electronics assembly 360c.

Electronics assembly 360c may be configured to receive data generated by mounted sensor 386 via connection 388. Upon reception of the data, the electronics assembly 360c may be configured similarly to electronics assembly 360a and/or may include the functionality of electronics assembly 360a and/or 360b described above with respect to FIGS. 3A and 3B, respectively. In addition or instead of the temperature/shock-wear relationship described above for electronics assembly 360a, a temperature/shock-wear relationship of electronics assembly 360c may relate temperature data taken nearby shock absorber 380 via mounted sensor 386 to shock-wear values and/or other values.

Figure 3D:
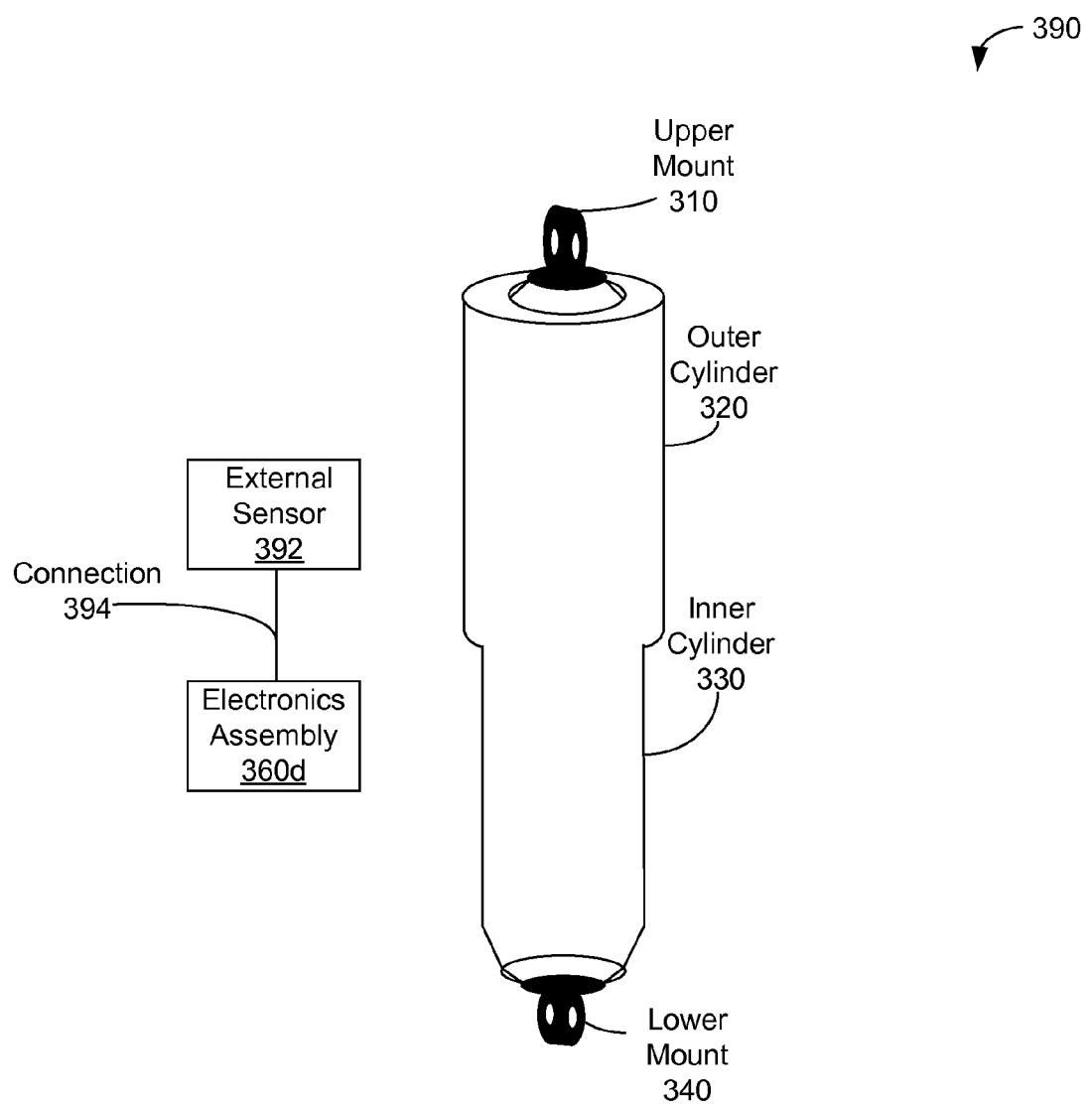

FIG. 3D is a cross-sectional view of an example shock absorber 390 in accordance with embodiments of the invention. As with shock absorber 300, shock absorber 390 includes an upper mount 310, outer cylinder 320, inner cylinder 330, and lower mount 340.

External sensor 392 may be configured to generate temperature and/or other data from outside, but nearby, shock absorber 390. External sensor 392 may be or include one or more RTDs, resistance thermometers, thermocouples, thermometers, and/or other temperature or heat-measuring devices, as well as devices to take other measurements. In some embodiments, external sensor 392 may be part of electronics assembly 360d and connection 394 may or may not be present in such embodiments.

External sensor 392 may be configured to generate temperature and/or other data from outside, but nearby, shock absorber 390. The temperature and/or data may include one or more measurements of temperature near outer cylinder 320, inner cylinder 330, average temperature measurements, measurements of changes in temperature, and/or a combination of these measurements. Other temperature measurements and/or temperature data are possible as well. Further, mounted sensor 392 may perform other types of measurements of shock absorber 390. External sensor 392 differs from mounted sensor 386 of FIG. 3C in that external sensor 392 may not be mounted near shock absorber 390. For example, external sensor 392 may be an infra-red detector/wand or other temperature sensor configured for use by a technician or other person to determine the temperature of shock absorber 390 by placing external sensor 392 near shock absorber 390.

FIG. 3D shows external sensor 392 connected to electronics assembly 360d via connection 394. Connection 394 may include wired and/or wireless connections such as described above with connection 350 of FIG. 3A. In embodiments where external sensor 392 is part of electronics assembly 360d, electronics assembly 360d may receive data generated by sensors that are part of electronics assembly 360d.

Connection 394 may include wired and/or wireless connections such as described above with connection 350 of FIG. 3A. In embodiments where external sensor 392 is part of electronics assembly 360d, electronics assembly 360d may receive data generated by sensors that are part of electronics assembly 360d.

External sensor 392 may be configured to communicate data with electronics assembly 360d via connection 394. Upon reception of the data, the electronics assembly 360d may be configured similarly to electronics assembly 360a and/or may include the functionality of electronics assembly 360a, 360b and/or 360c described above with respect to FIGS. 3A, 3B, and 3C, respectively. In addition or instead of the temperature/shock-wear relationship described above for electronics assembly 360a, a temperature/shock-wear relationship of electronics assembly 360d may relate temperature data taken nearby shock absorber 390 via external sensor 392 to shock-wear values and/or other values.

An Example Scenario with Multiple Shock Absorbers

Figure 3E:
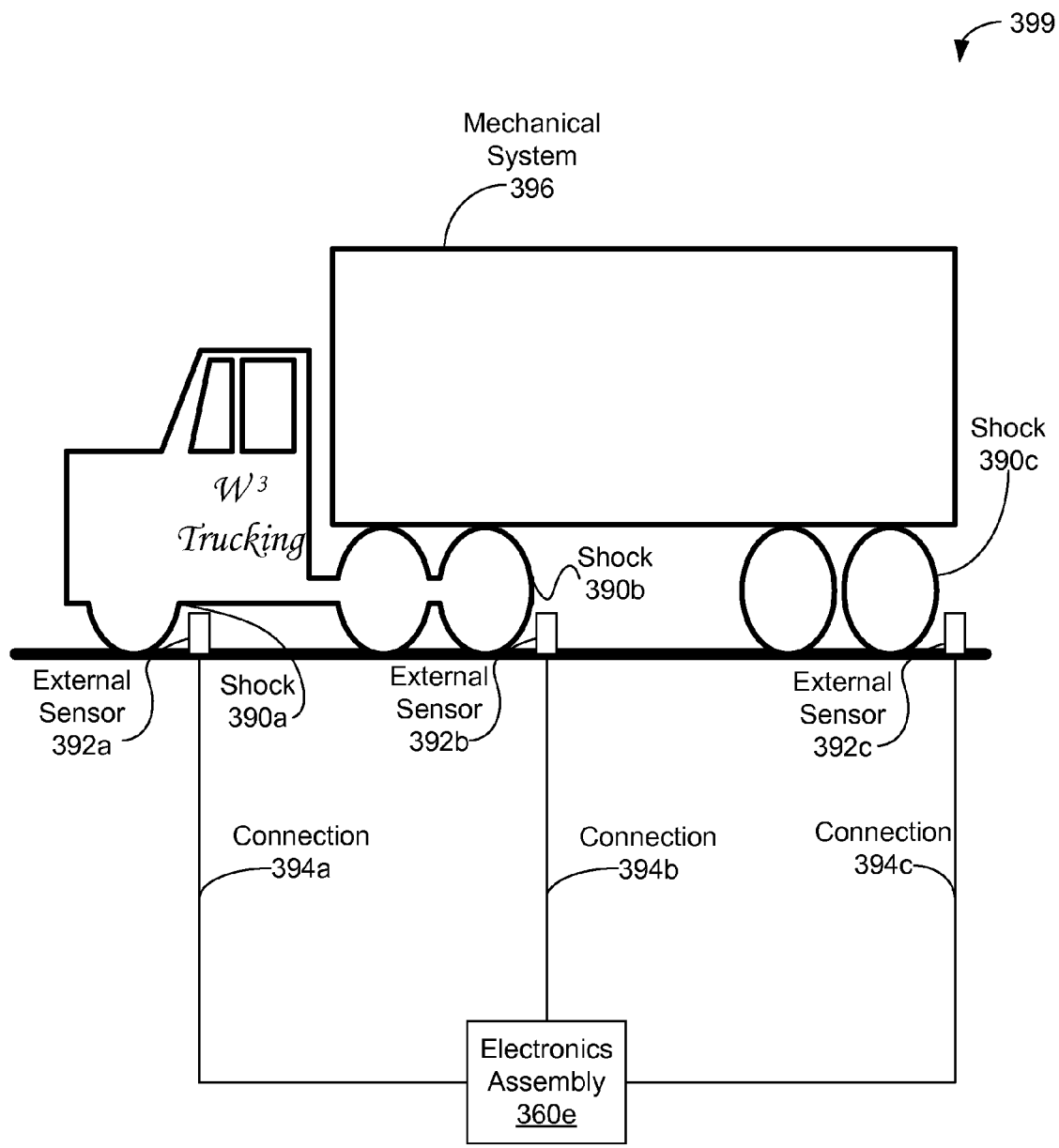
FIG. 3E depicts a scenario where characteristics of multiple shock absorbers of a mechanical system are measured in accordance with embodiments of the invention.

FIG. 3E depicts a scenario 399 where characteristics of multiple shock absorbers 390a, 390b, and 390c of a mechanical system 396 are measured in accordance with embodiments of the invention.

FIG. 3E shows mechanical system 396 with three shock absorbers ("shocks") 390a, 390b, and 390c. Each of shock absorbers 390a, 390b, and 390c may be a shock absorber 390 as described above with respect to FIG. 3D. Similarly, each of external sensors 392a, 392b, and 392c may be an external sensor 392 and/or each of connections 394a, 394b, and 394c may be a connection 394 as described above with respect to FIG. 3D. Mechanical system 396 may include more or fewer shock absorbers and/or external sensors than shown in FIG. 3E-three shock absorbers and three corresponding external sensors are shown for illustration purposes.

Upon reception of the data, the electronics assembly 360e may be configured similarly to electronics assembly 360a and/or may include the functionality of electronics assembly 360a, 360b, 360c, and/or 360d described above with respect to FIGS. 3A, 3B, 3C, and 3D respectively. In addition or instead of the temperature/shock-wear relationship described above for electronics assembly 360a, a temperature/shock-wear relationship of electronics assembly 360e may relate temperature data taken nearby shock absorbers 390a, 390b, and 390c via corresponding external sensors 392a, 392b, and 392c to shock-wear values and/or other values.

Additionally or instead to using a temperature/shock-wear relationship, differential temperatures and/or comparisons of temperature data taken nearby shock absorbers 390a, 390b, and 390c may be calculated as described below in more detail with respect to FIG. 5A.

Scenario 399 shows a vehicle (e.g., a truck) as a mechanical system 396, but any mechanical system with one or more shock absorbers may utilize one or more herein-described sensors, including combinations thereof, to determine condition(s) of the mechanical system via measuring properties of shock absorbers as described herein. In other scenarios, mechanical system 396 may also have fewer (e.g., two) or more shock absorbers—for example, if mechanical system 396 were a vehicle, mechanical system 396 may have one shock absorber for each wheel. In such scenarios, there may be a corresponding external sensor per shock absorber. In still other scenarios involving multiple shock absorbers, other herein-described shock absorbers (e.g., shock absorbers 300, 360, 370, and/or 380) may be utilized instead or as well.

An Example Computing Device

Figure 4:
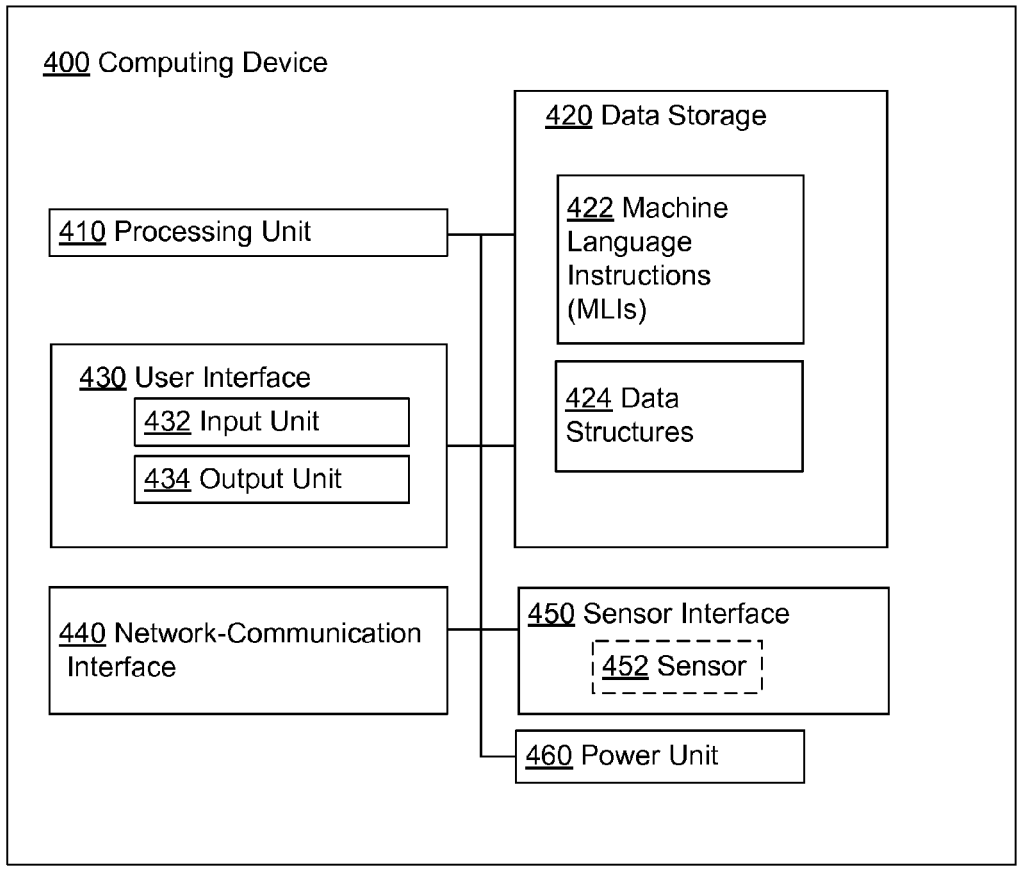
FIG. 4 is a block diagram of an example computing device in accordance with embodiments of the invention.

FIG. 4 is a block diagram of an example computing device 400, comprising a processing unit 410, data storage 420, a user interface 430, a network-communication interface 440, a sensor interface 450, and a power unit 460, in accordance with embodiments of the invention. A computing device 400 may be a desktop computer, laptop or notebook computer, personal data assistant (PDA), mobile phone, embedded processor, or any similar device that is equipped with a processing unit capable of executing machine-language instructions that implement at least part of the herein-described method 700, and/or herein-described functionality of a shock-wear calculator, a shock-wear indicator, and/or combined indicator.

The processing unit 410 may include one or more central processing units, computer processors, mobile processors, digital signal processors (DSPs), microprocessors, computer chips, specialized logic circuitry, and similar processing units now known and later developed and may execute machine-language instructions and process data.

The data storage 420 may comprise one or more storage devices. The data storage 420 may include read-only memory (ROM), random access memory (RAM), removable-disc-drive memory, hard-disc memory, magnetic-tape memory, flash memory, and similar storage devices now known and later developed. The data storage 420 comprises at least enough storage capacity to contain machine-language instructions 422 and data structures 424.

The machine-language instructions 422 and the data structures 424 contained in the data storage 420 include instructions executable by the processing unit 410 and any storage required, respectively, to perform some or all of the procedures of herein-described method 700, and/or perform some of all of the herein-described functionality of an electronics assembly, shock-wear indicator, combined indicator, and/or a shock-wear calculator. The machine-language instructions 422 also may include instructions executable by the processing unit 410 to perform part or all of the functionality of an MS-alert apparatus and/or brake-wear calculator.

The terms tangible computer-readable medium and tangible computer-readable media, as used herein, refer to any tangible medium that can be configured to store instructions, such as machine-language instructions 422, for execution by a processing unit and/or computing device; e.g., processing unit 410. Such a medium may take many forms, including but not limited to, non-volatile media and volatile media. Non-volatile media includes, for example, ROM, flash memory, magnetic-disk memory, optical-disk memory, removable-disk memory, magnetic-tape memory, and paper cards. Volatile media include dynamic memory, such as main memory or RAM. As such, the herein-described data storage 420 may comprise and/or be one or more tangible computer-readable media.

The user interface 430 may comprise an input unit 432 and/or an output unit 434. The input unit 432 may receive user input from a user of the computing device 400. The input unit 432 may comprise a keyboard, a keypad, a touch screen, a computer mouse, a track ball, a joystick, and/or other similar devices, now known or later developed, capable of receiving user input from a user of the computing device 400.

The output unit 434 may provide output to a user of the computing device 300. The output unit 434 may comprise a visible output device, such as one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information to a user of computing device 400. The output unit 434 may alternately or additionally comprise one or more aural output devices, such as a speaker, speaker jack, audio output port, audio output device, earphones, and/or other similar devices, now known or later developed, capable of conveying sound and/or audible information to a user of computing device 400. In particular, the output unit may comprise a combined indicator, shock-wear indicator, brake-wear indicator, and/or an MS-health indicator.

The network-communication interface 440 is configured to send and receive data and may include a wired-communication interface and/or a wireless-communication interface. The wired-communication interface, if present, may comprise a wire, cable, fiber-optic link or similar physical connection to a wide area network (WAN), a local area network (LAN), one or more public data networks, such as the Internet, one or more private data networks, or any combination of such networks. The wireless-communication interface, if present, may utilize an air interface, such as an IEEE 802.15.4 (ZigBee), IEEE 802.11 (e.g., Wi-Fi) and/or IEEE 802.16 (e.g., WiMax) interface to one or more sensors, a WAN, a LAN, one or more public data networks (e.g., the Internet), one or more private data networks, or any combination of public and private data networks.

The sensor interface 450 may be configured to receive and/or generate data about one or more characteristics of shock absorbers. The sensor interface 450 may comprise a wire, cable, fiber-optic link or similar physical connection to one or more sensors. The sensor interface 450 may optionally comprise one or more sensors 452 shown using dashed lines in FIG. 4. The sensor(s) 452 may be a sleeve, internal sensor, mounted sensor, external sensor, and/or plurality of external sensors, described with reference to FIGS. 3A, 3B, 3C, 3D, and 3E above, respectively, to measure one or more characteristics (e.g., temperature) of a measured device (e.g., a shock absorber).

The power unit 460 may be configured to provide electrical power to the computing device 400. The power unit 460 may comprise circuitry to utilize either alternating current or direct current. For example, the power unit 460 may comprise a connection to draw input power from an external power source and a power supply configured to convert input power for use by the computing device 460. Example external power sources are an electrical grid, electrical generator, and/or one or more electrical batteries, such as a vehicle battery.

The power unit 460 may comprise one or more electrical batteries. The batteries may utilize one or more storage technologies to store electrical energy, such as, but not limited to carbon-zinc, lead-acid, alkaline (zinc-manganese oxide), and/or lithium-ion technologies.

The power unit 460 may comprise an energy harvester. The energy harvester may include a piezoelectric device. A piezoelectric device is a device that may generate electrical power based on mechanical stress, such as vibrations of a vehicle engine and/or wheel. The energy harvester may comprise a device that generates electrical power from heat energy and/or kinetic energy as well. The energy harvester may comprise one or more solar cells to generate electrical power from energy radiated from the sun.

Example Shock-Wear Indicators

Figure 5A:
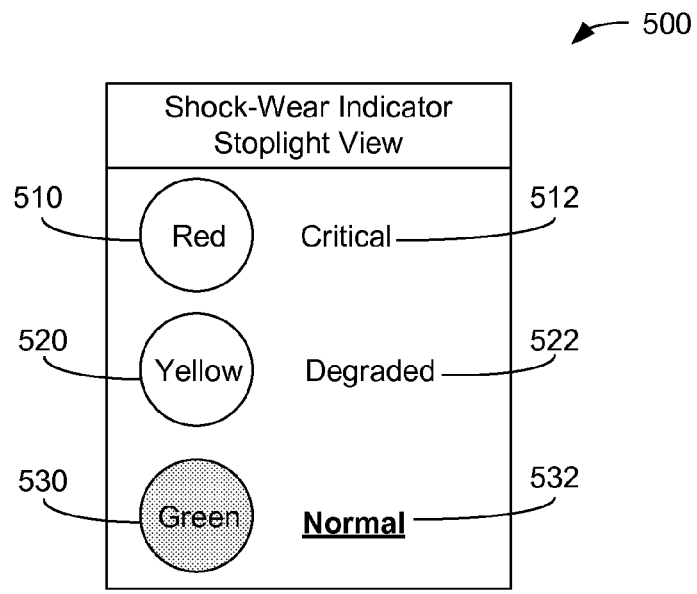
FIG. 5A shows an example shock-wear indicator with a stop-light display in accordance with embodiments of the invention.

FIG. 5A shows an example shock-wear indicator 500 with a stop-light display, in accordance with embodiments of the invention. The shock-wear indicator 500 may be (part of) the output unit 434 described above with respect to FIG. 4.

A shock-wear value may be determined based on one or more measurements of shock absorbers. An example process that may determine the shock-wear value is:

(i) Relate the measurements of temperature(s) of shock-absorber(s) to shock-wear values.

(ii) Measure the temperature (and possibly other characteristics) of the shock absorber of interest.

(iii) Using the temperature/shock-wear relationship determined above, determine the shock-wear value based on the measurement of characteristic of the shock absorber(s) of interest.

Testing and/or other empirical studies of shock absorbers under various wear conditions may determine a temperature/shock-wear relationship between shock-absorber temperatures and shock wear. As indicated above, Ramos provides an example of such testing and empirical studies. The testing and/or empirical studies may measure temperature of shock absorbers at various wear conditions of the tested shock absorbers (e.g., when the tested shock absorbers are new and have no wear, when the tested shock absorbers are approximately half-way through their RUL, when the tested shock absorbers are at the end of their RUL, etc.).

The temperature/shock-wear relationship may provide an estimated-mileage value as well. The estimated-mileage value may be determined by the same testing or empirical studies of shock absorbers under various wear conditions used to determine the shock-wear values. The estimated-mileage value may indicate a number of miles before estimated replacement of a shock absorber. As such, the estimated-mileage value may be an indicator of RUL for the shock absorber.

The determined temperature/shock-wear relationship may be a well-known mathematical relationship (e.g., measurements of temperature and shock wear for a given type of shock absorbers may have a linear, piece-wise linear, quadratic, or exponential relationship). The determined temperature/shock-wear relationship may be, also or in addition, a table of measurement values and related shock-wear values. An example table of measured temperatures and related shock-wear values (indicated as a percentage of shock wear) and estimated-mileage values for a given amount of operating time (e.g., 3000 seconds, 2 hours) is shown below as Table 1.

TABLE 1

| Measurement Value | Shock-Wear value | Estimated Mileage |
|---|---|---|
| 72° C. | 90% | 0 |
| 70° C. | 60% | 5000 |
| 65° C. | 15% | 40000 |

While Table 1 shows measurement values, shock-wear values, and estimated-mileage values in one table, it is to be understood that the shock-wear values may be stored and the estimated-mileage values may be stored in separate tables (or similar data structures) as well. Additionally, other tables may be stored at other amounts of operating time (e.g., one table per 600 second or 1000 seconds of operation). It is also to be understood that the shock-wear values may indicate a shock-absorber-life value instead or as well. The shock-absorber-life value may be the opposite of the shock-wear value, e.g. 100% minus the shock-wear value. Further, it is to be understood that a shock-wear value and/or a shock-absorber-life value may be expressed as a number other than as a percentage, instead or as well. Additionally, the example Table 1 shown above may include other information as well or instead; e.g. operating time information.

Then, the temperature/shock-wear relationship may be indicated by presenting a measurement value, perhaps at a given operating time, to a lookup table (or similar data structure, such as, but not limited to, a database or hash table) storing the table of temperatures and related shock wear. Similarly, the estimated-mileage/RUL value for the presented measurement may be determined based on the presented measurement value. The related shock wear value and/or the estimated-mileage value may be refined by use of interpolation, such as linear or quadratic interpolation, of the lookup table entries as well.

Also, different data for the temperature/shock-wear relationship may be stored depending on the type of sensor(s) used to measure the temperature of the shock absorber. For example, the temperature/shock-wear relationship may use different temperature values for temperatures determined by use of internal sensors than for temperatures determined by use of sleeves, external sensors, and/or mounted sensors.

Information about the temperature/shock-wear relationship may be stored in one or more data structures 424 stored in the data storage 420 of a computing device 400, perhaps acting as an electronics assembly or a shock-wear calculator. For example, an above-described absolute profile or relative profile may include part or all of the temperature/shock-wear relationship.

A shock-wear state may be determined by comparing a shock-wear value with one or more shock-wear thresholds. The shock-wear thresholds may be stored in an absolute profile, a relative profile, and/or a shock-wear-threshold table. The profile and/or shock-wear-threshold table may be stored in one or more data structures 424 in the data storage 420 by a computing device 400, perhaps acting as an electronics assembly or a shock-wear calculator.

The shock-wear thresholds may be determined by presenting the shock-wear value to a shock-wear-threshold data structure, which may store a value of shock-wear thresholds.

Table 2A below is an example table of shock-wear thresholds:

TABLE 2A

| Threshold | Value |
|---|---|
| Degraded Threshold | 90% |
| Normal Threshold | 60% |

In this example, the shock-wear state corresponds to: (i) a critical shock-wear state if the shock-wear value is greater than the degraded threshold, (ii) a degraded shock-wear state if the shock-wear value is greater than the normal threshold and less than or equal to the degraded threshold, or (iii) a normal shock-wear state if the shock-wear value is less than or equal to the normal threshold.

For example, using the values of Table 2A, the shock-wear state is determined to be critical if the shock-wear value is greater than the degraded threshold of 90%. If the shock-wear value is greater than the normal threshold of 60% and less than or equal to the degraded threshold of 90%, the shock-wear state is determined to be degraded. Also, if the shock-wear value is less than or equal to the normal threshold of 60%, the shock-wear state is determined to be normal.

An imminent-failure shock-wear state may be determined as well. The imminent-failure shock-wear state may be determined by use of an additional threshold added to the table of shock wear thresholds, such as shown in example Table 2B below.

TABLE 2B

| Threshold | Value |
|---|---|
| Critical Threshold | 95% |
| Degraded Threshold | 90% |
| Normal Threshold | 60% |

In the example of Table 2B, the shock-wear state may be an imminent-failure shock-wear state if the shock-wear value is greater than the critical threshold of 95% and the shock-wear state may be a critical shock-wear state if the shock-wear value is greater than the degraded threshold of 90% but less than the critical threshold of 95%. The shock-wear state may be determined to be in a degraded shock-wear state or a normal shock-wear state in the example of Table 2B in the same fashion as discussed above for the example of Table 2A.

The shock-wear state may be determined to be an imminent-failure shock-wear state based on other measurements as well. For example, the shock-wear state may be an imminent-failure shock-wear state if a temperature of the shock absorber is determined to be below an imminent-failure-temperature threshold. The shock-wear state may be determined to be an imminent-failure shock-wear state based on other characteristics of the shock absorber as well, such as detecting a mechanical condition of the shock absorber that indicates the shock absorber may have failed, e.g., a measurement of an amount of compression of the shock absorber after an impact.

If data from multiple shock absorbers are available, such described above with respect to FIG. 3E, differential temperatures and/or comparisons of temperature data from multiple shock absorbers may be used to determine shock-wear values and/or a condition of a mechanical system, including but not limited to a shock-wear state.

For example, suppose example data in Tables 3A, 3B, and 3C below were gathered at three different times for three mechanical systems, each with four shock absorbers (e.g., an automobile):

TABLE 3A

| Shock Absorber | Temperature | Diff 1 | Diff 2 | Diff 3 | Diff 4 |
|---|---|---|---|---|---|
| 1 | 71.9° C. | 0 | +1.3 | −1.2 | −0.2 |
| 2 | 73.2° C. | −1.3 | 0 | −2.5 | −1.5 |
| 3 | 70.7° C. | +1.2 | +2.5 | 0 | +1.0 |
| 4 | 71.7° C. | +0.2 | +1.5 | −1.0 | 0 |
| Sum | | +0.1 | +5.3 | −4.7 | −0.7 |
| Avg. | | +0.03 | +1.77 | −1.57 | −0.23 |

TABLE 3B

| Shock Absorber | Temperature | Diff 1 | Diff 2 | Diff 3 | Diff 4 |
|---|---|---|---|---|---|
| 1 | 71.9° C. | 0 | +1.3 | −1.2 | −10.2 |
| 2 | 73.2° C. | −1.3 | 0 | −2.5 | −11.5 |
| 3 | 70.7° C. | +1.2 | +2.5 | 0 | −9.0 |
| 4 | 61.7° C. | +10.2 | +11.5 | +9.0 | 0 |
| Sum | | +10.1 | +15.3 | +5.3 | −30.7 |
| Avg. | | +3.37 | +5.1 | +1.77 | −10.23 |

TABLE 3C

| Shock Absorber | Temperature | Diff 1 | Diff 2 | Diff 3 | Diff 4 |
|---|---|---|---|---|---|
| 1 | 71.9° C. | 0 | +1.3 | +18.8 | −0.2 |
| 2 | 73.2° C. | −1.3 | 0 | +17.5 | −1.5 |
| 3 | 90.7° C. | −18.8 | −17.5 | 0 | −19.0 |
| 4 | 71.7° C. | +0.2 | +1.5 | +19 | 0 |
| Sum | | −19.9 | −14.7 | +55.3 | −20.7 |
| Avg. | | −6.63 | −4.9 | +18.43 | −6.9 |

The "Diff 1" column of Table 3A above shows differential temperatures with respect to shock absorber 1. Each differential temperature may be determined via the equation: $DT(i,j)=T(i)-T(j)$, where $DT(i,j)$ is the differential temperature between shock absorber i and shock absorber j and where $T(i)$ and $T(j)$ are measured temperatures of shock absorbers i and j, respectively. As a special case, $DT(i,i)$ is 0. If the differential temperature $DT(i,j)$ is a positive number, then $T(i)>T(j)$, if $DT(i,j)=0$, then $T(i)=T(j)$, and if $DT(i,j)$ is a negative value, then $T(i)<T(j)$.

For example, the non-zero differential temperatures in the Diff 1 column of Table 1, $DT(1,2)$, $DT(1,3)$ and $DT(1,4)$ respectively indicate that $T(1)$, the temperature of shock absorber 1 measured at 71.9° C., is: 1.3° C. less than the temperature of shock absorber 2 $T(2)$, 1.2° C. more than the temperature of shock absorber 3, and 10.4° C. more than that of shock absorber 4. Table 3A shows the sum of differential temperatures for shock absorbers 1 through 4 as +0.1, +5.3, −4.7, and −0.7, respectively, and shows the average differential temperatures (that is averaged over the three non-special-case differential temperatures) for shock absorbers 1 through 4 as +0.33, +1.77, −1.57, and −0.23, respectively. The differential temperatures in the remaining "Diff" columns in Tables 3A, 3B, and 3C may be interpreted in a similar fashion. Also the sum of each column of differential temperatures is provided.

The magnitude(s) of differential temperature(s) for a given shock absorber may be combined to determine a shock-wear value. For example, Table 3A shows the sum of the differential temperatures for shock absorber 1 as +0.1 and the corresponding average value as +0.03. Either a sum or an average value may be interpreted as a shock-wear value. Additionally or instead, maximum and/or minimum differential temperatures may be used as shock-wear values.

One or more shock-wear values then may be interpreted to determine a condition of the mechanical system. In some embodiments, a range of the shock-wear values may be determined and compared to thresholds to determine a condition of the mechanical system. For example, the average values of the differential temperatures of Table 3A may be interpreted as shock-wear values. In this example, the range of shock-wear values is (−1.57, +1.77). The range values indicate that (a) a "span" or difference of endpoint values of the range of shock-wear values is +1.77−(−1.57)=3.34 and (b) a difference between the absolute values of the endpoints of the range is 1.77−1.57=0.2.

The span and/or the difference between the absolute values may be compared to thresholds to determine a condition of the mechanical system. For example, suppose Table 3D of span values and corresponding conditions were used to interpret a condition of the mechanical system:

TABLE 3D

| Span | Condition |
|---|---|
| 4.99999 or less | Normal |
| 5.0-10.0 | Degraded |
| Greater than 10 | Critical |

Then, a span of 3.34 may be interpreted as indicating the mechanical system that generated the example data of Table 3A is functioning normally.

For the example data of Table 3B, the range of average values is (−10.23, 3.37) with a corresponding span of 13.6 and an absolute value of the endpoints of 6.86. As interpreted by the values of Table 3D, the mechanical system that generated the data of Table 3B may be interpreted to be in a critical condition as the span is greater than 10. Similarly for the example data of Table 3C, the range of average values is (−6.63, +18.43) for a span of 25.06. As interpreted by the values of Table 3D, the mechanical system of that generated the data of Table 3C may be interpreted to be in a critical condition as the span is greater than 10.

If the mechanical system is interpreted to be in a degraded or critical condition, the sign of largest average value may be used to further interpret the condition of the mechanical system. For example, if the largest average value is negative, this may indicate that a shock absorber is considerably cooler than the other shock absorbers, such as shock absorber 4 of the example of Table 3B. When a shock absorber is considerably cooler than other shock absorbers, the considerably-cooler shock absorber may have failed for the reasons described above. Then, if the largest average value is negative, the degraded or critical condition may be interpreted as the considerably-cooler shock absorber is in a degraded or critical condition. Thus, data from multiple shock absorbers may be used to determine a shock-wear state.

As another example, if the largest average value is positive, this may indicate that a shock absorber is considerably warmer than the other shock absorbers, such as shock absorber 3 of the example of Table 3C. When a shock absorber is considerably warmer than other shock absorbers, the shock absorber and/or one or more components near the considerably-warmer shock absorber may have failed. These components include, but are not limited to, wheel bearings, brakes, tires and/or wheels. Then, if the largest average value is positive, the degraded or critical condition may be interpreted as a condition of nearby component(s) to the considerably-warmer shock absorber are in a degraded or critical condition. Thus, data from multiple shock absorbers may be used to determine a condition of the mechanical system that is different from a shock-wear state.

Similarly, a sign of a shock-wear value determined using a temperature/shock-wear relationship may be used to indicate a condition of the mechanical system. For example, if a shock-wear value is less than a shock-wear value indicated via temperature/shock-wear relationship of a relative or absolute profile and the corresponding shock-wear state is degraded or critical, the shock-wear value may be interpreted as described above for a considerably-cooler shock. Also, if a shock-wear value is greater than a shock-wear value indicated via temperature/shock-wear relationship of the relative or absolute profile and the corresponding shock-wear state is degraded or critical, the shock-wear value may be interpreted as described above for a considerably-warmer shock.

The shock-wear value and/or the shock-wear state may be sent from an electronics assembly and/or a shock-wear calculator to an external computing device 270. The electronics assembly and/or a shock-wear calculator may use the format of an MS-health record to send the shock-wear value, condition(s) of the mechanical system, and/or the shock-wear state.

The MS-health record is described with respect to FIG. 8 of the MS-Alert Application. The substantial contents of FIG. 8 are reproduced in Table 4 below:

TABLE 4

| MS-Health Record |
|---|
| Date/time information |
| Type of measurement |
| Type of action |
| Measurement data |
| Engine-health state |
| MS identifier |
| Model ID of MS |
| Other characteristics |

Using the above MS-health record, a shock-wear value may be sent to the external computing device 270 with a type of measurement such as "Shock-Wear value" and with measurement data including the shock-wear value. Similarly, a shock-wear state may be sent to the external computing device 270 with a type of measurement such as "Shock-Wear state" and with measurement data including the shock-wear state. Further, a shock condition and/or shock absorber location, such as a textual string or shock absorber identifier, may be sent in an MS-health record, perhaps as an MS identifier (e.g., a shock absorber identifier, condition of the mechanical system) and/or as "other characteristics" (e.g., a textual string indicating shock absorber location, a textual or alphanumeric string indicating condition(s) of the mechanical system).

The shock-wear calculator 240 and/or the external computing device 270 may generate a trend analysis diagram based on data about the vehicle 200. As described in more detail in the MS-Alert Application, particularly with respect to FIG. 10 of the MS-Alert Application, a trend analysis diagram shows a graph of an MS-health indicator or a MS-measurement value (e.g., shock wear) over time with respect to one or more MS-health states (e.g., critical, degraded, or normal).

The plurality of MS-health records may be made available to the external computing device 270, shock-wear calculator 240, and/or electronics assembly 314 operable as a planning tool, such as the exemplary convoy planning tool described in the Fleet-Planning Application. The planning tool may generate the trend analysis diagram, based, at least in part, on data stored in the plurality of MS-health records. The trend analysis diagram may be generated with custom software, general database software written by vendors such as Honeywell International, Inc. of Morristown, N.J., internal database tools, or by a plurality of software resources.

The data in the plurality of the MS-health records also may be used, perhaps by the planning tool, to schedule maintenance activities, such as scheduling the repair of a shock absorber whose shock-wear state is indicated in one or more MS-health records to be "degraded" or "critical" or whose shock-wear value is greater than 70%.

The stop-light display may comprise graphical indicators of the shock-wear state. FIG. 5A shows shock-wear indicator 500 with three graphical indicators: a critical graphical indicator 510, a degraded graphical indicator 520, and a normal graphical indicator 530. FIG. 5A also shows the graphical indicators 510, 520, and 530 as circular in shape and arranged with the critical graphical indicator 510 above the degraded graphical indicator 520, and the degraded graphical indicator 520 above the normal graphical indicator 530.

FIG. 5A shows the shock-wear indicator 500 with three textual indicators: a critical textual indicator 512, a degraded textual indicator 522, and a normal textual indicator 532. It is to be understood that the shock-wear indicator may comprise more or fewer indicators, preferably depending on a corresponding increase or decrease of possible shock-wear states.

The shock-wear indicator 500 may display graphical and/or textual indicators of the shock-wear value and/or the estimated-mileage value without use of a stop-light indicator.

Figure 5B:
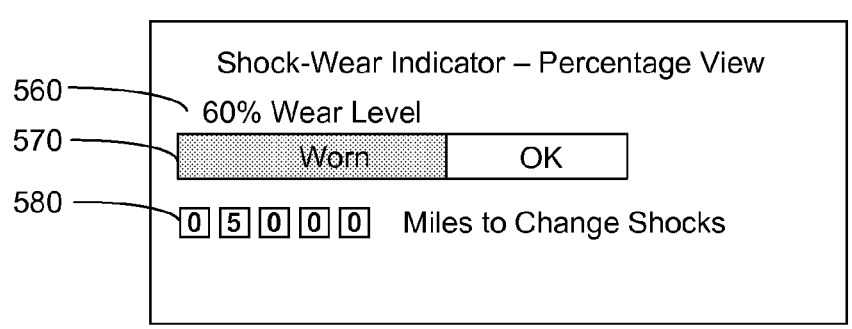
FIG. 5B shows an example shock-wear indicator with a percentage view in accordance with embodiments of the invention.

FIG. 5B shows an example shock-wear indicator 550 displaying a percentage view of the shock-wear value using both a textual-percentage-wear indicator 560 and a graphical-percentage-wear indicator 570 in accordance with embodiments of the invention. As shown in FIG. 5B, both the textual-percentage-wear indicator 560 and the graphical-percentage-wear indicator 570 indicate a shock absorber at a 60% wear level. FIG. 5B shows a shock absorber-wear-mileage-estimate indicator 580 indicating the shock absorber has an estimated-mileage value of 5000 miles.

A graphical and/or a textual indicator may indicate a shock-wear state. Example shock-wear states include a normal shock-wear state, a degraded shock-wear state, a critical shock-wear state, and an imminent-failure shock-wear state. It is to be understood that more or fewer shock-wear states may be displayed using graphical and/or a textual indicator.

Figure 6A:
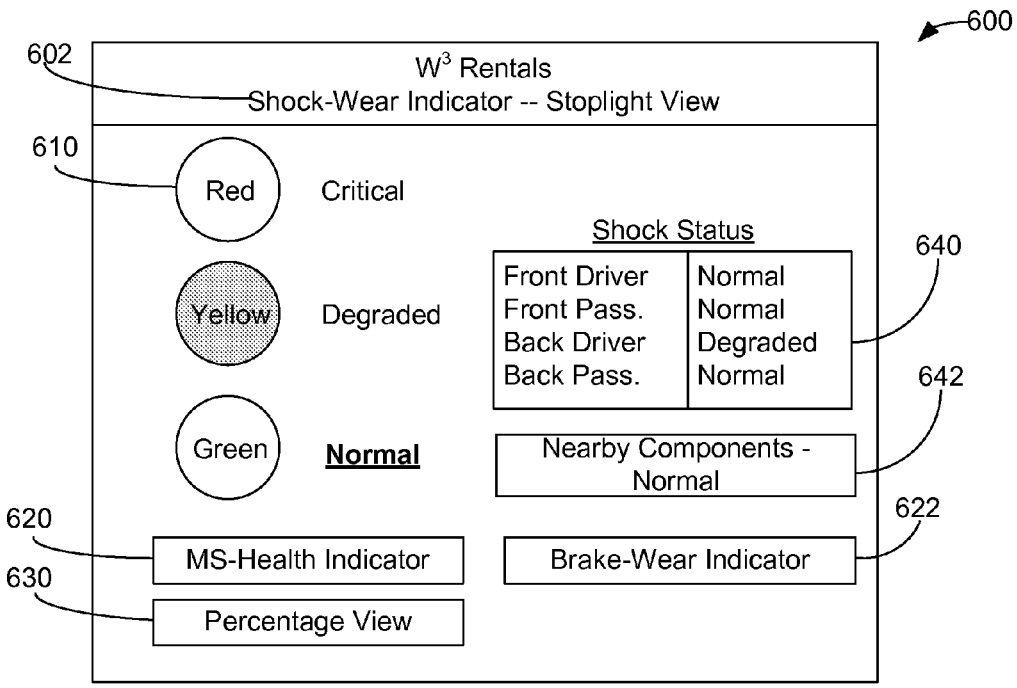
FIGS. 6A and 6B show example combined indicators in accordance with embodiments of the invention.
Figure 6B:
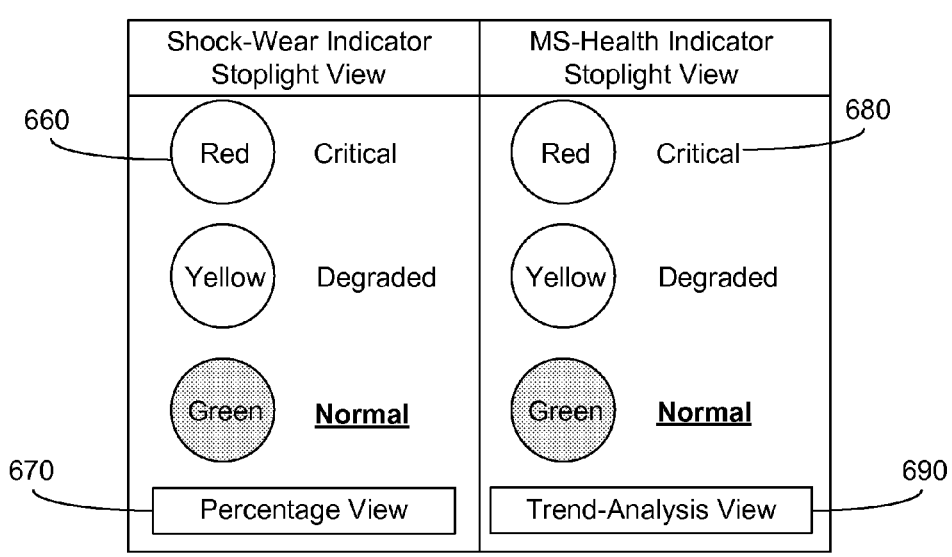

In FIGS. 5A, 6A and 6B, a shock-wear state is indicated by showing: (i) a graphical indicator as shaded and (ii) a textual indicator in a bold and underlined typeface. FIG. 5A indicates the normal shock-wear state by showing the normal graphical indicator 510 as shaded and the normal textual indicator 512 in a bold and underlined typeface. A shock-wear calculator or electronics assembly may change other aspects of a graphical indicator to indicate a shock-wear state, such as, but not limited to, the color, brightness, size, and shape of the graphical indicator. The shock-wear calculator or electronics assembly may change other aspects of a textual indicator to indicate a shock-wear state, such as, but not limited to foreground color, background color, brightness, size, position, and wording of the textual indicator. Further, a textual and/or graphical indicator may flash and/or change position on a shock-wear indicator to indicate a shock-wear state, such as a normal shock-wear state, a degraded shock-wear state, a critical shock-wear state and/or an imminent-failure shock-wear state.

For example, an imminent-failure shock-wear state may be indicated by having the critical graphical indicator 530 of FIG. 5A or the graphical-percentage-wear indicator 570 of FIG. 5B flash and/or be displayed with an imminent-failure-oriented color (e.g., red), having the critical textual indicator 532 of FIG. 5A and/or the textual-percentage-wear indicator 570 of FIG. 5B change text (e.g., to "Imminent Failure!"), typeface, and/or color, and/or display a separate imminent-failure shock-wear indicator 540 for FIG. 5A or imminent-failure shock-wear indicator 590 for FIG. 5B. Other techniques for indicating an imminent failure are possible as well.

FIG. 6A shows an example combined indicator 600, in accordance with embodiments of the invention. The combined indicator 600 may provide the functionality of the shock-wear indicator described herein with the functionality of a brake-wear indicator and/or MS-health indicator. The MS-health indicator is described in detail in the MS-Alert Application. The brake-wear indicator is described in detail in the Brake-Wear Application. FIG. 6A shows the combined indicator 600 with a stop-light display 610, indicator buttons 620 and 622, a display button 630, a shock absorber-status table 640.

A title 602 may also indicate a manufacturer or other entity associated with the combined indicator 600; e.g., W³ Rentals. The title 602 indicates the combined indicator 600 is acting as a shock-wear indicator and thus the stop-light display 610 acts to indicate a shock absorber is in a degraded state. If the combined indicator 600 were acting as an MS-health or brake-wear indicator instead, the stop-light display 600 and/or title 602 may change to indicate that the combined indicator 600 was acting as an MS-health indicator (e.g., "MS-Health Indicator—Stop-Light Display") or brake-wear indicator (e.g., "Brake-Wear Indicator—Stop-Light Display"), respectively.

FIG. 6A shows the indicator button 620 with text of "MS-Health Indicator" and indicator button 622 with text of "Brake-Wear Indicator". Indicator button 620, when selected, may toggle the functionality of the combined indicator 600 between acting as a shock-wear indicator (as shown in FIG. 6A) and acting as an MS-health indicator. Similarly, indicator button 622, when selected, may toggle the functionality of the combined indicator 600 between acting as a shock-wear indicator and as a brake-wear indicator. Indicator buttons 620 and 622 may be selected with an input device, such as a mouse, or the combined shock-wear indicator. The combined indicator 600 may use a touch screen and, in that case, the indicator buttons 620 and 622 may be selected by touch.

When the combined indicator 600 is acting as an MS-health indicator, the text of the indicator button 620 may change to show the non-selected option (e.g., "Shock-wear indicator") and/or upon selection of the MS-health indicator button 620, the combined indicator 600 may then toggle to act as a shock-wear calculator. Similarly, when the combined indicator 600 is acting as a brake-wear indicator, the text of the indicator button 622 may change to show the non-selected option (e.g., "Shock-wear indicator") and/or upon selection of the brake-wear indicator button 622, the combined indicator 600 may toggle to act as a shock-wear calculator.

FIG. 6A shows the display button 630. Selection of the display button 630 may cause the display shown on the combined indicator 600 to toggle between a stop-light display (as shown in FIG. 6A) and a percentage-display. Upon selection to display a percentage display, the text of the display button 630 may change to indicate the non-selected option (e.g., "Stop-Light Display") and the combined indicator 600 may show a percentage display.

FIG. 6A also shows a shock-status table 640, indicating the shock-wear state and locations of multiple shock absorbers. The shock-status table 640 may indicate the shock-wear state and/or shock-wear value for some or all of the shock absorbers of a mechanical system, such as a vehicle. The shock-status table 640 may indicate the locations for some or all of the shock absorbers of the mechanical system. In some scenarios, such as described above with respect to FIG. 5, a condition of components nearby to a shock absorber may be determined. FIG. 6A shows an indication 642 of components nearby to a shock absorber as "Normal".

FIG. 6B shows an example combined indicator 650, in accordance with embodiments of the invention. The combined indicator 650 simultaneously displays a shock-wear indicator 660 and an MS-health indicator 680. A display button 670 performs a similar function to the display button 630 described above with respect to FIG. 6A. The trend-analysis button 690 toggles the display of the MS-health indicator 680 between a stop-light display as shown in FIG. 6B and a trend-analysis display. The trend-analysis display of the combined shock-wear indicator and MS-health indicator 650 may display a trend analysis diagram, described above with respect to FIG. 6. The text of the MS-display button 690 may change to indicate the non-selected option as well.

In embodiments not shown in FIG. 6B, combined indicator 650 simultaneously may instead or also display either (a) a shock-wear indicator and a brake-wear indicator or (b) a shock-wear indicator, a brake-wear indicator, and a MS-health indicator.

An Example Method for Indicating a Condition of a Shock Absorber

Figure 7:
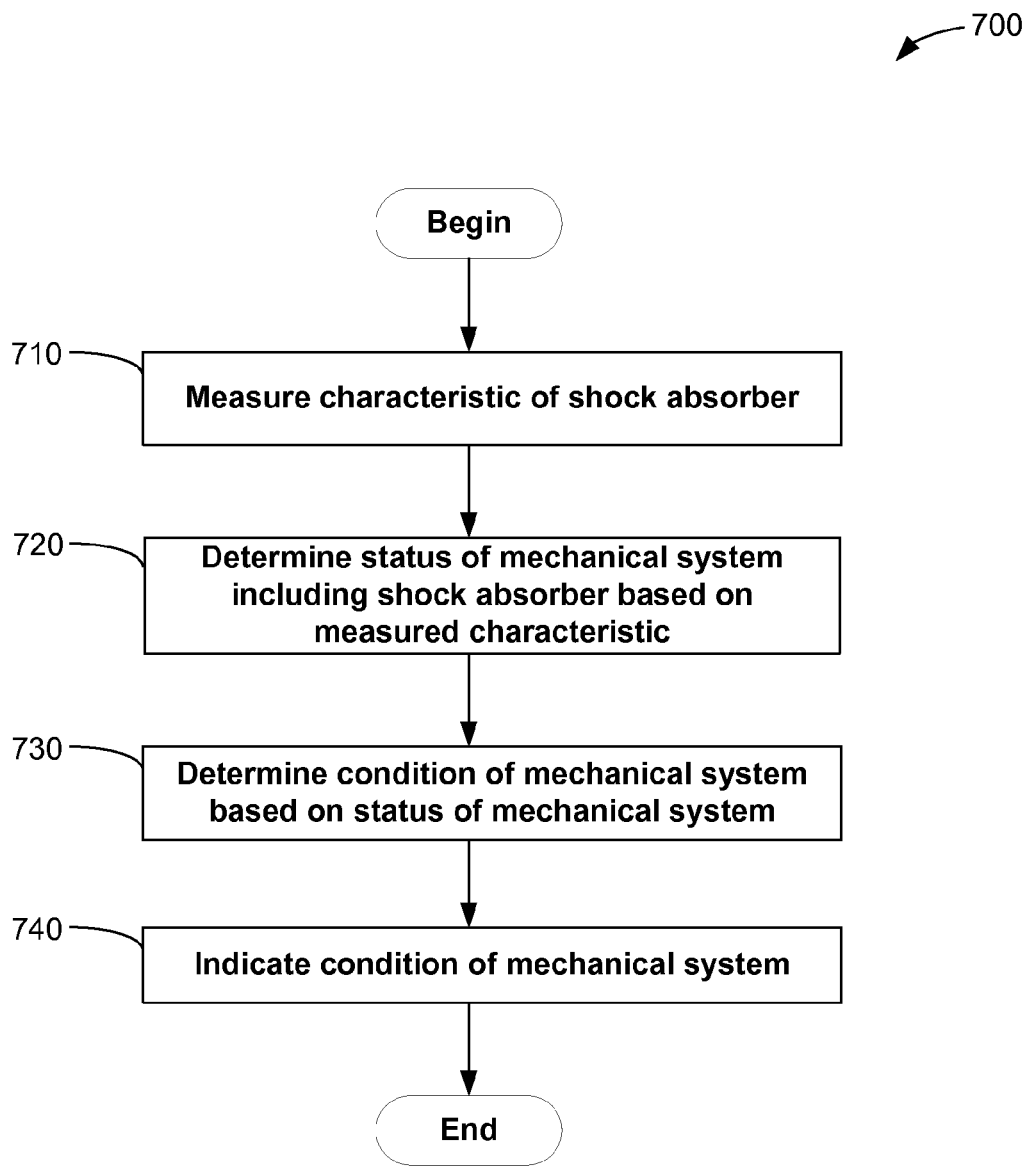
FIG. 7 is a flowchart depicting an example method in accordance with embodiments of the invention.

FIG. 7 is a flowchart depicting an example method 700, in accordance with embodiments of the invention. It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

The method 700 begins at block 710. At block 710, a characteristic of a shock absorber is measured. For example, a temperature of the shock absorber may be measured, perhaps by a temperature sensor. The temperature sensor may measure a temperature inside of the shock absorber, on a surface of the shock absorber, and/or near the shock absorber. The temperature sensor may be configured as part of a cylinder, piston, and/or piston rod of a shock absorber to measure temperature(s) inside the shock absorber. The temperature sensor may be configured as a sleeve to measure temperature(s) on surface(s) of the shock absorber. The temperature sensor may be configured as an external sensor mounted near the shock absorber or as a sensor that can be placed to measure temperature(s) nearby the shock absorbers. Example configurations of temperature sensors are described above in more detail with respect to FIGS. 3A, 3B, 3C, 3D, and 3E.

In some scenarios, such as but not limited to the scenario described above with respect to FIG. 3E, data may be generated and/or characteristics may be measured for multiple (i.e., two or more) shock absorbers. A mechanical system (e.g., a vehicle) may include the multiple shock absorbers. The data and/or characteristics may include a temperature for each of the multiple shock absorbers.

At block 720, a status of a mechanical system including the shock absorber may be determined based on the measured characteristic. For example, the status of the mechanical system may be the shock wear for the shock absorber. In some scenarios, the mechanical system may be the shock absorber. The shock wear of the shock absorber may be determined based on temperature data generated by one or more temperature sensors, such as the temperature sensors described above with respect to block 710.

The shock wear of the shock absorber may be determined using a temperature/shock-wear relationship. The temperature/shock-wear relationship may relate a temperature (and perhaps other characteristics of one or more shock absorbers) to a shock-wear value, shock-absorber-life value, RUL value, and/or an estimated-mileage value based on testing of shock absorbers at various wear conditions and/or at various operating times, such as described above in more detail with respect to FIG. 5A. The temperature/shock-wear relationship may be stored in one or more lookup tables or similar data structures of a computing device, such as computing device 400 described above with respect to FIG. 4.

In some scenarios, the status of the mechanical system may be a shock-wear value for each of multiple shock absorbers of the mechanical system. The shock-wear value for each of the multiple shock absorbers may be determined by comparing the measured data for each of the two or more shock absorbers and/or determining differential temperatures between the multiple shock absorbers as described above with respect to FIG. 5A.

At block 730, a condition of the mechanical system may be determined based on the status of the mechanical system. For example, a condition of the shock absorber may be determined based on the determined shock-wear. The condition of the shock absorber may include a shock-wear value, a shock-absorber-life value, a shock-wear state, an estimated-mileage value, or a combination of the shock-wear value, the shock-absorber-life value, the estimated-mileage value, and/or the shock-wear state. The shock-wear state may be determined by comparing a shock-wear value to one or more shock absorber-wear thresholds, such as described above in more detail with respect to FIG. 5A. The one or more shock absorber-wear thresholds may be stored in a table or similar data structure of a computing device, such as computing device 400 described above with respect to FIG. 4.

In some scenarios, the condition of the mechanical system may be determined based on comparing and/or determining differential temperatures for each of the multiple shock absorbers in the mechanical system as described above with respect to FIG. 5A. The condition of the mechanical system may be a shock-wear state and/or a condition of a condition of nearby component(s) to a shock absorber. The differential temperatures and/or information about span values and corresponding conditions described above with respect to FIG. 5A may be stored in one or more tables or similar data structure(s) of a computing device, such as computing device 400 described above with respect to FIG. 4.

At block 740, a condition of the mechanical system may be indicated. For example, a condition of a shock absorber may be indicated. A shock-wear indicator and/or a combined indicator, such as described above with respect to FIGS. 5A, 5B, 6A, and 6B, may indicate the condition of the shock absorber. A stop-light display and/or a percentage display may indicate the condition of the shock absorber. A trend analysis diagram may indicate the condition of the shock absorber. A location of the shock absorber may be indicated along with the condition of the shock absorber. If a device utilizing the shock absorber also utilizes other shock absorber(s), condition(s) of the other shock absorber(s) of the device may be indicated as well, perhaps using a shock-status table. Also or instead, a condition of a condition of nearby component(s) to a shock absorber may be indicated such as shown in FIG. 6A.

After executing the procedures of block 740, method 700 may end.

Conclusion

While certain features and embodiments of the present invention have been described in detail herein, it is to be understood that the invention encompasses all modifications and enhancements within the scope and spirit of the following claims.

In particular, while the shock absorbers described herein have been shown as adapted for use with motor vehicles, the invention could be used with other types of vehicles not specifically described above, such as, but not limited to, ships, boats, rail cars, locomotive engines, elevators, cranes, tanks, trolleys, airplanes, all-terrain vehicles, bicycles, tricycles, unicycles, and motorcycles.

Also, the invention could be used with machinery other than vehicles that are equipped with shock absorbers, such as, but not limited to, factory equipment, mining equipment, elevators, fitness gear, heavy-duty flamethrowers, and self-propelled weapons.

What is claimed is:

1. A device, comprising:
  a shock absorber;
  a temperature sensor coupled to the shock absorber and configured to generate temperature data based on measuring a temperature of the shock absorber; and
  an electronics assembly coupled to receive the temperature data from the temperature sensor and configured to determine a condition of the shock absorber based on the temperature data.

2. The device of claim 1, wherein the device is a vehicle.

3. The device of claim 1, wherein the temperature sensor is configured to measure a temperature inside of the shock absorber.

4. The device of claim 1, wherein the temperature sensor is configured to measure a temperature of a surface of the shock absorber.

5. The device of claim 4, wherein the temperature sensor is attached to the surface of the shock absorber.

6. The device of claim 5, wherein the temperature sensor is removably attached to the surface of the shock absorber.

7. The device of claim 6, wherein the temperature sensor is configured as a sleeve to cover at least a portion of the shock absorber.

8. The device of claim 1, wherein the electronics assembly comprises an energy harvester.

9. The device of claim 1, wherein the condition of the shock absorber is a shock-wear value.

10. The device of claim 1, wherein the electronics assembly comprises a network-communication interface, and wherein the network-communication interface is configured to transmit the condition of the shock absorber.

11. The shock absorber of claim 10, wherein the network-communication interface comprises a wireless interface.

12. A system, comprising:
  a first shock absorber configured for use in a vehicle;
  a first sensor coupled to the first shock absorber and configured to generate first shock-absorber data, wherein the first shock-absorber data comprises temperature data of the first shock absorber;

a shock-wear calculator coupled to receive the first shock-absorber data, comprising:

a processing unit, a shock-wear indicator, data storage, and machine-language instructions stored in the data storage and executable by the processing unit to perform functions including:

receiving the first shock-absorber data, and displaying an indication of the condition of the first shock absorber on the shock-wear indicator, wherein the condition of the first shock absorber is based on the first shock-absorber data.

13. The system of claim 12, wherein the machine language instructions executable to display the indication of the condition of the first shock absorber are executable to display an indication that the condition of the first shock absorber is critical.

14. The system of claim 13, wherein the functions further include:

receiving the second shock-absorber data; and displaying an indication of the condition of the second shock absorber on the shock-wear indicator, wherein the condition of the second shock absorber is based on the second shock-absorber data.

15. The system of claim 12, further comprising:

a second shock absorber adapted for use in the vehicle; and a second sensor coupled to the second shock absorber and configured to generate second shock-absorber data, wherein the second shock-absorber data comprises temperature data of the second shock absorber.

16. The system of claim 15, wherein the functions further include displaying a shock-absorber status comprising:

an indication of the condition of the first shock absorber, a location of the first shock absorber, an indication of the condition of the second shock absorber, and a location of the second shock absorber.

17. A method, comprising:

a temperature sensor couple to a shock absorber for measuring a temperature of a shock absorber; and at least one processor for determining a status of the shock absorber based on the measured temperature of the shock absorber;

determining a condition of the shock absorber based on the status of the shock absorber; and indicating the condition of the shock absorber.

18. The method of claim 17, wherein determining the status of the shock absorber comprises determining a shock-wear value of the shock absorber based on a relative profile.

19. The method of claim 17, wherein determining the status of the shock absorber comprises determining a shock-wear value of the shock absorber based on an absolute profile.

* * * * *